United States Patent
Matsui et al.

(10) Patent No.: US 10,310,177 B2
(45) Date of Patent: Jun. 4, 2019

(54) PHOTONIC CRYSTAL FIBER

(71) Applicant: NIPPON TELEGRAPH AND TELEPHONE CORPORATION, Chiyoda-ku, Tokyo (JP)

(72) Inventors: Takashi Matsui, Tsukuba (JP); Kyozo Tsujikawa, Tsukuba (JP); Fumihiko Yamamoto, Tsukuba (JP); Nobutomo Hanzawa, Tsukuba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 15/563,988

(22) PCT Filed: Mar. 22, 2016

(86) PCT No.: PCT/JP2016/058980
§ 371 (c)(1),
(2) Date: Oct. 3, 2017

(87) PCT Pub. No.: WO2016/167083
PCT Pub. Date: Oct. 20, 2016

(65) Prior Publication Data
US 2018/0172902 A1   Jun. 21, 2018

(30) Foreign Application Priority Data
Apr. 14, 2015 (JP) .................................. 2015-082511

(51) Int. Cl.
*G02B 6/02* (2006.01)

(52) U.S. Cl.
CPC ..... *G02B 6/02295* (2013.01); *G02B 6/02009* (2013.01); *G02B 6/02023* (2013.01);
(Continued)

(58) Field of Classification Search
CPC ............ G02B 6/02295; G02B 6/02314; G02B 6/02023; G02B 6/02009; G02B 6/02328; H01S 2301/03
(Continued)

(56) References Cited

U.S. PATENT DOCUMENTS 6,334,019 B1 * 12/2001 Birks ..................... B82Y 20/00
385/125
7,280,730 B2 * 10/2007 Dong ................. G02B 6/02009
385/126
(Continued)

FOREIGN PATENT DOCUMENTS

JP   2003-255153 A   9/2003
JP   2010-197730 A   9/2010
(Continued)

OTHER PUBLICATIONS

Swan et al., "33pm Core effectively single-mode chirally-coupled-core fiber laser at 1064-nm", OFC 2008, OWU 2, 2008, 3 pages.
(Continued)

*Primary Examiner* — Robert Tavlykaev
(74) *Attorney, Agent, or Firm* — Ohlandt, Greeley, Ruggiero & Perle, L.L.P.

(57) ABSTRACT

An object of the present invention is to provide a structure of an optical fiber capable of satisfying desired requirements of an output power, a propagation distance, and a beam quality. In the design of the PCF of the present invention, the PCF has air holes having diameters d and intervals $\Lambda$ in an overlapping region where a region of $A_{eff}$ of a desired value or more and a cutoff region in a desired higher-order mode overlap each other on a graph where the horizontal axis represents $d/\Lambda$ and the vertical axis represents $\Lambda$, so that it is possible to sufficiently cut off the mode which is the
(Continued)

desired higher-order mode or more, and thus, it is possible to select a region where the $A_{eff}$ is large.

12 Claims, 27 Drawing Sheets

(52) U.S. Cl.
CPC ..... *G02B 6/02314* (2013.01); *G02B 6/02328* (2013.01); *G02B 6/02309* (2013.01); *G02B 6/02347* (2013.01)

(58) Field of Classification Search
USPC .................................................. 385/123, 125
See application file for complete search history.

(56) References Cited

U.S. PATENT DOCUMENTS

| | | | | |
|---|---|---|---|---|
| 9,632,243 | B2* | 4/2017 | Dong | G02B 6/02009 |
| 2010/0135628 | A1* | 6/2010 | Mukasa | G02B 6/02019 |
| | | | | 385/123 |
| 2010/0157418 | A1 | 6/2010 | Dong et al. | |
| 2011/0091176 | A1* | 4/2011 | Takahashi | G02B 6/02019 |
| | | | | 385/125 |
| 2012/0134636 | A1 | 5/2012 | Tsuchida et al. | |
| 2013/0084077 | A1 | 4/2013 | Mukasa | |
| 2013/0209046 | A1* | 8/2013 | Tanigawa | G02B 6/02347 |
| | | | | 385/126 |
| 2013/0251320 | A1* | 9/2013 | Hayashi | G02B 6/02042 |
| | | | | 385/100 |
| 2014/0133816 | A1* | 5/2014 | Mukasa | G02B 6/02347 |
| | | | | 385/123 |
| 2014/0212103 | A1 | 7/2014 | Taunay | |
| 2014/0233900 | A1 | 8/2014 | Hugonnot et al. | |
| 2015/0063380 | A1* | 3/2015 | Liu | H01S 3/2383 |
| | | | | 372/6 |

FOREIGN PATENT DOCUMENTS

| | | |
|---|---|---|
| JP | 2014-49763 A | 3/2014 |
| JP | 2014-119558 A | 6/2014 |
| JP | 2014-531618 A | 11/2014 |
| WO | 2011115146 A1 | 9/2011 |
| WO | 2013051295 A1 | 4/2013 |

OTHER PUBLICATIONS

Hanzawa et al., "A study on input-power-expanding in Photonic Crystal Fiber," IEICE Technical Report, May 21, 2009, vol. 109, No. 59, 11 pages.

Ichige et al., "All Solid Photonic Bandgap Fiber with Low Bending Loss and Large Effective Core Cross Section", IEICE Society conference, B-13-23, 2012, 3 pages.
Yoda et al., "Beam quality of higher order modes in a step-index fiber", J. Lightwave Technol., vol. 24, No. 3, pp. 1350-1355, Mar. 2006.
Mafi et al., "Beam Quality of Photonic-Crystal Fibers", Journal of Lightwave Technology, Jul. 7, 2005, vol. 23, No. 7, pp. 2267-2270.
Wong et al., "Breaking the limit of maximum effective area for robust single-mode propagation in optical fibers", Opt. Lett., vol. 30, No. 21, pp. 2855-2857, Nov. 1, 2005.
Napierala et al., "Extremely large-mode-area photonic crystal fibre with low bending loss", Opt. Express, vol. 18, No. 15, pp. 15408-15418, Jul. 6, 2010.
Kashiwagi et al., "Effectively single-mode all-solid photonic bandgap fiber with large effective area and low bending loss for compact high-power all-fiber lasers", Opt. Express, Jun. 20, 2012, vol. 20, No. 14, pp. 15061-15070.
Saitoh et al., "Empirical relations for simple design of photonic crystal fibers", Optical Society of America, Optics Express, Jan. 10, 2005, vol. 13, No. 1, pp. 267-274.
Saitoh et al., "Full-vectorial finite element beam propagation method with perfectly matched layers for anisotropic optical waveguides", IEEE J. Lightwave technol., vol. 19, No. 3, pp. 405-413, Mar. 2001.
Dong et al., "Leakage channel optical fibers with large effective area" Journal of the Optical Society of America B, Aug. 2007, vol. 24, No. 8, pp. 1689-1697.
Agrawal, "Nonlinear Fiber Optics", Fourth Edition, Academic Press, 3 pgs.
Oguama et al., "Simultaneous measurement of the Raman gain coefficient and the nonlinear refractive index of optical fibers: theory and experiment", J. Opt. Soc. Am. B, Feb. 2005, vol. 22, No. 2, pp. 426-436.
Japanese Office Action dated Nov. 10, 2015 from corresponding Japanese Application JP 2015-082511, 9 pages.
International Search Report dated Jun. 28, 2016 from corresponding PCT International Application PCT/JP2016/058980, 2 pages.
Japanese Office Action dated Feb. 27, 2018 in corresponding Japanese Patent Application No. JP 2017-512248, 9 pages.
International Preliminary Report on Patentability dated Oct. 26, 2017 from corresponding PCT International Application PCT/JP2016/058980, 10 pages.
Dianov et al., "Solid-Core Photonic Bandgap Fibers for High-Power Fiber Lasers", IEEE Journal of Selected Topics in Quantum Electronics, IEEE Service Center, Piscataway, NJ, US, vol. 15, No. 1, Jan. 1, 2009 (Jan. 1, 2009), 11 pages.
Extended European Search Report dated Apr. 5, 2018 in corresponding European Patent Application No. 16779871.9, 8 pages.
Extended European Search Report dated Nov. 29, 2018 in corresponding European Patent Application No. 16779874.3, 8 pages.

* cited by examiner

| MODE | FIELD PATTERN |
|---|---|
| $LP_{01}$ |  |
| $LP_{11}$ |  |
| $LP_{21}$ |  |
| $LP_{02}$ |  |
| $LP_{31}$ |  |

PHOTONIC CRYSTAL FIBER

TECHNICAL FIELD

The present invention relates to a structure of an optical fiber that propagates light with high power and high quality.

BACKGROUND ART

At present, there are two types of optical fibers, namely, single-mode and multi-mode optical fibers used in the field of laser processing by using a fiber laser. In a single-mode optical fiber used in laser processing, it is generally considered that a value of $M^2$ as an index of beam quality is 2 or less. Therefore, since the beam quality of the single-mode optical fiber used to propagate emitted light of the fiber laser is better than that of the multi-mode optical fiber, the processing merit is great. However, an output power and a propagatable distance are limited by a nonlinear optical phenomenon, particularly, stimulated Raman scattering (SRS), and, for example, in the case of propagating a light wave with 1 kW or more, the propagatable distance is limited to several meters. For this reason, in some cases, the output power of the fiber laser may be propagated from several tens of meters to several hundreds of meters by using a multi-mode optical fiber and may be used for laser processing in some cases. However, in multi-mode fiber lasers, the beam quality and the value of $M^2$ as an index of the beam quality are inevitably degraded in comparison with single-mode fiber lasers.

In addition, as disclosed in Non Patent Literature 1, a single-mode fiber laser capable of obtaining an output power of about 10 kW is realized, however the length of the delivery fiber (feeding fiber) is limited to several meters. This is because, in order to suppress the SRS with the single-mode optical fiber, it is necessary to enlarge an effective area ($A_{eff}$) as described later, but at the same time, since the expansion is a tradeoff with the increase of a bending loss, it is necessary to expand an outer diameter of the delivery optical fiber to the order of millimeters to realize a much larger $A_{eff}$. If the outer diameter is increased in this manner, flexibility of the optical fiber is lost, it is difficult to bend the optical fiber, and thus, there is a problem that damage or breakage easily occurs and the optical fiber is not suitable for long-distance delivery.

To summarize the above, in the related art, it is very difficult to propagate kW-class high power light with a single-mode optical fiber and a fiber laser from several tens of meters to several hundreds of meters.

In order to solve this problem, it is effective to enlarge the effective area $A_{eff}$ (which is generally proportional to the square of a mode field diameter) which is one of parameters of the optical fiber, and for example, design of a single-mode optical fiber with various refractive index distributions disclosed in Non Patent Literatures 2 to 5 has been studied.

However, although the values of $A_{eff}$ in the optical fiber disclosed in the cited literatures are prescribed, a propagation distance usable with respect to the output power and the like are not clarified, and it is not obvious whether the kW-class high power light can be propagated from several tens to several hundreds of meters. Furthermore, a range of the outer diameter of the optical fiber considering the flow of the fiber design and the practicality are not clarified.

CITATION LIST

Non Patent Literature

Non Patent Literature 1: Ichige et al., "All Solid Photonic Bandgap Fiber with Low Bending Loss and Large Effective Core Cross Section", IEICE Society conference, B-13-23, 2012. (in Japanese)

Non Patent Literature 2: W. S. Wong et al., "Breaking the limit of maximum effective area for robust single-mode propagation in optical fibers", Opt. Lett., vol. 30, no. 21, pp. 2855-2857, 2005.

Non Patent Literature 3: M. Napeirala et al., "Extremely large-mode-area photonic crystal fibre with low bending loss", Opt. Express, vol. 18, no. 15, pp. 15408-15418, 2010.

Non Patent Literature 4: M. Kashiwagi et al., "Effectively single-mode all-solid photonic bandgap fiber with large effective area and low bending loss for compact high-power all-fiber lasers", Opt. Express, vol. 20, no. 14, pp. 15061-15070, 2012.

Non Patent Literature 5: M. C. Swan et al., "33 μm Core effectively single-mode chirally-coupled-core fiber laser at 1064 nm", OFC 2008, OWU 2, 2008.

Non Patent Literature 6: H. Yoda et al., "Beam quality factor of higher order modes in a step-index fiber", J. Lightwave Technol., vol. 24, no. 3, pp. 1350-1355, 2006.

Non Patent Literature 7: G. P. Agrawal, "Nonlinear Fiber Optics", ACADEMIC PRESS.

Non Patent Literature 8: F. A. Oguama et al., "Simultaneous measurement of the Raman gain coefficient and the non-linear refractive index of optical fibers: theory and experiment", J. Opt. Soc. Am. B, vol. 22, no. 2, pp. 426-436, 2005.

Non Patent Literature 9: Kunimasa Saitoh, Masanori Koshiba, "Full-vectorial finite element beam propagation method with perfectly matched layers for anisotropic optical waveguides", IEEE J. Lightwave technol., vol. 19, no. 3, pp. 405-413, 2001.

Non Patent Literature 10: Kunimasa Saitoh, Masanori Koshiba, "Emprical relations for simple design of photonic crystal fibers", Optical Society of America, Optics Express, 10 Jan. 2005, Vol. 13, No. 1, pp. 267-274.

SUMMARY OF INVENTION

Technical Problem

As described above, the structure of the optical fiber that can satisfy the requirements for an output power, a propagation distance, and a beam quality required in the examination examples in the related art has not been clarified.

Therefore, an object of the present invention is to provide an optical fiber design method of designing an optical fiber that can satisfy desired requirements of an output power, a propagation distance, and a beam quality and the optical fiber.

Solution to Problem

In order to achieve the above-described object, $A_{eff}$ is calculated from desired specifications of an optical fiber, a fiber structure is provisionally determined, and it is decided that the fiber structure is corrected in consideration of a relationship with a bending loss value in a fundamental mode or higher-order mode.

More specifically, the optical fiber design method according to the present invention includes:

a specification value determining step of determining fiber loss and Raman gain coefficient of a photonic crystal fiber (PCF) to be used, a wavelength of propagating light, a beam quality M² after PCF propagation, a laser output power value, a propagation distance, and a minimum bending radius;

maximum number of propagation modes calculating step of calculating the number n of propagation modes that can be propagated by using Mathematical Formula 1;

an effective area calculating step of calculating an effective area $A_{eff}$ from the fiber loss and the Raman gain coefficient by using Mathematical Formula 2;

a fiber structure calculating step of calculating diameter d and interval Λ of air holes of the PCF satisfying the $A_{eff}$;

a bending loss calculating step of calculating a bending loss at the minimum bending radius in a PCF having a structure calculated in the fiber structure calculating step and calculating a bending loss at a propagation length from the propagation distance;

a checking step of checking that the bending loss at the propagation length is less than a predetermined value and determining the structure of the PCF calculated in the fiber structure calculating step; and a mode increasing step of, in a case where the bending loss at the propagation length is equal to or more than the predetermined value in the checking step, repeating the fiber structure calculating step, the bending loss calculating step, and the checking step by increasing the number of modes by one until the number of modes reaches the number n of propagation modes.

Mathematical Formulas 1 and 2 will be described later.

In an optical fiber design method according to the present invention, a necessary $A_{eff}$ of the optical fiber is calculated from requirements, a structure of a photonic crystal fiber (PCF) satisfying this is provisionally set, and the structure of the PCF is finely adjusted so that a bending loss becomes less than a specified value.

In addition, the fiber structure may be determined by using the following method.

Namely, in an optical fiber design method according to the present invention includes:

a specification value determining step of determining a fiber loss and Raman gain coefficient of a photonic crystal fiber (PCF) to be used, a wavelength of propagating light, a beam quality M2 after PCF propagation, a laser output power value, a propagation distance, and a minimum bending radius;

maximum number of propagation modes calculating step of calculating the number n of propagation modes that can be propagated by using Mathematical Formula 1;

an effective area calculating step of calculating an effective area $A_{eff}$ from the fiber loss and the Raman gain coefficient by using Mathematical Formula 2;

a fiber structure calculating step of calculating diameter d and interval Λ of air holes of the PCF having the $A_{eff}$ or more and plotting points having the $A_{eff}$ or more on a graph of which the horizontal axis is d/Λ and of which the vertical axis is Λ;

a bending loss calculating step of calculating a bending loss at a minimum bending radius of a smallest higher-order mode cut off by the PCF from the diameter d and the interval Λ of the air holes of the PCF and plotting points having the bending loss of 1 dB/m or more on a graph of which the horizontal axis is d/Λ and of which the vertical axis is Λ; and a structure determining step of detecting an overlapping range where a region of the points plotted on the graph in the fiber structure calculating step and a region of the points plotted on the graph in the bending loss calculating step overlap each other and determining a PCF structure having air holes having diameters d and intervals Λ in the overlapping range.

Mathematical Formulas 1 and 2 will be described later.

In the design of the PCF, the PCF has air holes having diameters d and intervals Λ in an overlapping region where a region of $A_{eff}$ of a desired value or more and a cutoff region in a desired higher order overlap each other on a graph where the horizontal axis represents d/Λ and the vertical axis represents Λ, so that it is possible to sufficiently cut off the mode which is the desired higher-order mode or more, and thus, it is possible to select a region where the $A_{eff}$ is large.

Therefore, according to the present invention, it is possible to provide an optical fiber design method capable of satisfying desired requirements of an output power, a propagation distance, and a beam quality.

This is an example of a PCF designed by the optical fiber design method.

The PCF is a photonic crystal fiber (PCF) having a 1-cell structure in which air holes with diameters d are arranged at intervals Λ in a cross-section, wherein an effective area Aeff is 160 μm² or more, wherein the air holes having diameters d and intervals Λ are included in a design region (FIG. 19(c)) surrounded by a polygon having vertices A1 (0.42, 16.88),
B (0.42, 10.94),
C (0.75, 14.24),
D (0.75, 12.10),
E (0.79, 20.00),
F (0.85, 30.00),
G (0.85, 41.58),
H (0.89, 50.00),
I (0.89, 58.95),
J (0.90, 60.0), and
K (0.90, 91.88)

when coordinates are represented by (d/Λ, Λ), and wherein the number of propagation modes can be 4 or less with respect to light having a wavelength of 1050 nm or more in propagation of 30 kW·m or less.

It is possible to enlarge the $A_{eff}$ as large as possible while sufficiently cutting off the fourth higher-order mode or more.

In addition, when the air holes are in a region (FIG. 19(b)) surrounded by a polygon having vertices A1 (0.42, 16.88),
B (0.42, 10.94),
C1 (0.75, 15.00),
D1 (0.75, 20.00),
C2 (0.78, 35.00),
D2 (0.80, 35.93),
E (0.80, 45.63),
F (0.83, 51.56),
C3 (0.90, 54.38), and
I (0.90, 91.88), in the design region, the quality M2 of the output light can be 3.3 or less with respect to light having a wavelength of 1050 nm or more in propagation of 30 kW·m or less.

It is possible to enlarge the $A_{eff}$ as large as possible while sufficiently cutting off the third higher-order mode or more.

Furthermore, when the air holes are in a region (FIG. 19(a)) surrounded by a polygon having vertices A1 (0.42, 16.88),
B (0.42, 10.94),
C1 (0.60, 15.63),
C2 (0.69, 31.88),
D (0.74, 43.12), E (0.75, 44.38),
C3 (0.76, 47.81),
F (0.81, 60.63),
G (0.85, 60.63),
H (0.85, 77.50), and
I (0.90, 91.88),
in the design region,
the quality M2 of the output light can be 2 or less with respect to light having a wavelength of 1050 nm or more in propagation of 30 kW·m or less.

It is possible to enlarge the $A_{eff}$ as large as possible while sufficiently cutting off the first higher-order mode or more.

This is an example of a PCF designed by the optical fiber design method.

The PCF is a PCF having a 1-cell structure in which air holes with diameters d are arranged at intervals Λ in a cross-section,
wherein an effective area Aeff is 800 μm² or more,
wherein the air holes having diameters d and intervals Λ are included in a design region (FIG. 20(c)) surrounded by a polygon having vertices
A2 (0.48, 25.31),
F1 (0.85, 36.37),
G (0.85, 41.58),
H (0.89, 50.00),
I (0.89, 58.95),
J (0.90, 60.0), and
K (0.90, 91.88),
when coordinates are represented by (d/Λ, Λ), and
wherein the number of propagation modes can be 4 or less with respect to light having a wavelength of 1050 nm or more in propagation of 150 kW·m or less.

It is possible to enlarge the $A_{eff}$ as large as possible while sufficiently cutting off the fourth higher-order mode or more.

In addition, the air holes are in a region (FIG. 20(b)) surrounded by a polygon having vertices
A2 (0.47, 25.31),
C2 (0.78, 35.00),
C3 (0.90, 54.38),
D2 (0.80, 35.93),
E (0.80, 45.63),
F (0.83, 51.56), and
I (0.90, 91.88),
in the design region, and
the quality M2 of the output light can be 3.3 or less with respect to light having a wavelength of 1050 nm or more in propagation of 150 kW·m or less.

It is possible to enlarge the $A_{eff}$ as large as possible while sufficiently cutting off the third higher-order mode or more.

Furthermore, the air holes are in a region (FIG. 20(a)) surrounded by a polygon having vertices
A2 (0.48, 25.31),
C2 (0.69, 31.88),
D (0.74, 43.12),
E (0.75, 44.38),
F (0.81, 60.63),
G (0.85, 60.63),
H (0.85, 77.50), and
I (0.90, 91.88),
in the design region, and
the quality M2 of the output light can be 2 or less with respect to light having a wavelength of 1050 nm or more in propagation of 150 kW·m or less.

It is possible to enlarge the $A_{eff}$ as large as possible while sufficiently cutting off the first higher-order mode or more.

This is an example of a PCF designed by the optical fiber design method.

A PCF has a 1-cell structure in which air holes with diameters d are arranged at intervals Λ in a cross section,
wherein an effective area Aeff is 1600 μm² or more,
wherein the air holes having diameters d and intervals Λ are included in a design region (FIG. 21(c)) surrounded by a polygon having vertices
A3 (0.57, 40.00),
H1 (0.89, 54.37),
I (0.89, 58.95),
J (0.90, 60.0), and
K (0.90, 91.88),
when coordinates are represented by (d/Λ, Λ), and
wherein the number of propagation modes can be 4 or less with respect to light having a wavelength of 1050 nm or more in propagation at 300 kW·m or less.

It is possible to enlarge the $A_{eff}$ as large as possible while sufficiently cutting off the fourth higher-order mode or more.

In addition, the air holes are in a region (FIG. 21(b)) surrounded by a polygon having vertices
A3 (0.56, 40.00),
C3 (0.90, 54.38),
F (0.83, 51.56), and
I (0.90, 91.88),
in the design region, and
the quality M2 of the output light can be 3.3 or less with respect to light having a wavelength of 1050 nm or more in propagation at 300 kW·m or less.

It is possible to enlarge the $A_{eff}$ as large as possible while sufficiently cutting off the third higher-order mode or more.

Furthermore, the air holes are in a region (FIG. 21(a)) surrounded by a polygon having vertices
A3 (0.57, 40.00),
C3 (0.76, 47.81),
F (0.81, 60.63),
G (0.85, 60.63),
H (0.85, 77.50), and
I (0.90, 91.88),
in the design region, and
the quality M2 of the output light can be 2 or less with respect to light having a wavelength of 1050 nm or more in propagation at 300 kW·m or less.

It is possible to enlarge the $A_{eff}$ as large as possible while sufficiently cutting off the first higher-order mode or more.

This is an example of a PCF designed by the optical fiber design method.

A PCF has a 1-cell structure in which air holes with diameters d are arranged at intervals Λ in a cross-section,
wherein an effective area Aeff is 3200 μm² or more,
wherein the air holes having diameters d and intervals Λ are included in a design region (FIG. 22(c)) surrounded by a polygon having vertices
A4 (0.75, 68.36),
J1 (0.90, 77.07), and
K (0.90, 91.88),
when coordinates are represented by (d/Λ, Λ), and
wherein the number of propagation modes can be 4 or less with respect to light having a wavelength of 1050 nm or more in propagation at 600 kW·m or less.

It is possible to enlarge the $A_{eff}$ as large as possible while sufficiently cutting off the fourth higher-order mode or more.

This is an example of a PCF designed by the optical fiber design method.

A PCF has a 7-cell structure in which air holes with diameters d are arranged at intervals Λ in a cross-section,
wherein an effective area Aeff is 160 μm² or more,
wherein the air holes having diameters d and intervals Λ are included in a design region (FIG. 23(c)) surrounded by a polygon having vertices A1 (0.20, 10.98),
B (0.20, 5.11),
C (0.50, 6.23),
D (0.50, 10.00),
E (0.60, 15.18),
F (0.60, 17.76),
G (0.65, 20.12),
H (0.70, 20.35),
I (0.79, 25.06),
J (0.79, 29.53),
K (0.78, 29.76),
L (0.78, 38.29),
M (0.80, 40.12), and
N (0.80, 50.00), when coordinates are represented by (d/Λ, Λ), and
wherein the number of propagation modes can be 4 or less with respect to light having a wavelength of 1050 nm or more in propagation of 30 kW·m or less.

It is possible to enlarge the $A_{eff}$ as large as possible while sufficiently cutting off the fourth higher-order mode or more.

In addition, the air holes are in a region (FIG. 23(b)) surrounded by a polygon having vertices A1 (0.20, 10.98),
B (0.21, 5.11),
C1 (0.40, 5.90),
D (0.40, 10.03),
E (0.50, 11.93),
F (0.50, 14.47),
C3 (0.60, 20.18),
G (0.69, 22.08),
H (0.68, 23.67),
I (0.70, 24.30),
J (0.70, 32.87), and
K (0.80, 50.00), in the design region, and
the quality M2 of the output light can be 3.3 or less with respect to light having a wavelength of 1050 nm or more in propagation of 30 kW·m or less.

It is possible to enlarge the $A_{eff}$ as large as possible while sufficiently cutting off the third higher-order mode or more.

Furthermore, the air holes are in a region (FIG. 23(a)) surrounded by a polygon having vertices A1 (0.20, 10.98),
B (0.21, 4.95),
C1 (0.25, 5.27),
D (0.29, 9.87),
E (0.40, 12.25),
F (0.40, 13.52),
G (0.49, 14.15),
H (0.49, 15.74),
I (0.50, 18.12),
J (0.58, 18.12),
K (0.58, 19.86),
C3 (0.60, 20.34),
L (0.60, 23.03),
M (0.68, 23.99),
N (0.68, 31.60),
O (0.79, 48.73), and
P (0.80, 50.00), in the design region, and
the quality M2 of the output light can be 2 or less with respect to light having a wavelength of 1050 nm or more in propagation of 30 kW·m or less.

It is possible to enlarge the $A_{eff}$ as large as possible while sufficiently cutting off the first higher-order mode or more.

This is an example of a PCF designed by the optical fiber design method.

A PCF has a 7-cell structure in which air holes with diameters d are arranged at intervals Λ in a cross section,
wherein an effective area Aeff is 800 μm² or more,
wherein the air holes having diameters d and intervals Λ are included in a design region (FIG. 24(c)) surrounded by a polygon having vertices A2 (0.21, 11.77),
E (0.60, 15.18),
F (0.60, 17.76),
G (0.65, 20.12),
H (0.70, 20.35),
I (0.79, 25.06),
J (0.79, 29.53),
K (0.78, 29.76),
L (0.78, 38.29),
M (0.80, 40.12), and
N (0.80, 50.00), when coordinates are represented by (d/Λ, Λ), and
wherein the number of propagation modes can be 4 or less with respect to light having a wavelength of 1050 nm or more in propagation of 150 kW·m or less.

It is possible to enlarge the $A_{eff}$ as large as possible while sufficiently cutting off the fourth higher-order mode or more.

In addition, the air holes are in a region surrounded by a polygon having vertices A2 (0.21, 11.77),
C2 (0.50, 13.68),
C3 (0.60, 20.18),
F (0.50, 14.47),
G (0.69, 22.08),
H (0.68, 23.67),
I (0.70, 24.30),
J (0.70, 32.87), and
K (0.80, 50.00), in the design region, and
the quality M2 of the output light can be 3.3 or less with respect to light having a wavelength of 1050 nm or more in propagation of 150 kW·m or less.

It is possible to enlarge the $A_{eff}$ as large as possible while sufficiently cutting off the third higher-order mode or more.

Furthermore, the air holes are in a region surrounded by a polygon having vertices A2 (0.21, 11.77),
C2 (0.40, 12.88),
C3 (0.60, 20.34),
F (0.40, 13.52),
G (0.49, 14.15),
H (0.49, 15.74),
I (0.50, 18.12),
J (0.58, 18.12),
K (0.58, 19.86),
L (0.60, 23.03),
M (0.68, 23.99),
N (0.68, 31.60),
O (0.79, 48.73), and
P (0.80, 50.00), in the design region, and
the quality M2 of the output light can be 2 or less with respect to light having a wavelength of 1050 nm or more in propagation of 150 kW·m or less.

It is possible to enlarge the $A_{eff}$ as large as possible while sufficiently cutting off the first higher-order mode or more.

This is an example of a PCF designed by the optical fiber design method.

A PCF has a 7-cell structure in which air holes with diameters d are arranged at intervals Λ in a cross-section, wherein an effective area Aeff is 1600 μm² or more, wherein the air holes having diameters d and intervals Λ are included in a design region (FIG. 25(c)) surrounded by a polygon having vertices A3 (0.27, 16.06),
G (0.65, 20.12),
H (0.70, 20.35),
I (0.79, 25.06),
J (0.79, 29.53),
K (0.78, 29.76),
L (0.78, 38.29),
M (0.80, 40.12), and
N (0.80, 50.00), when coordinates are represented by (d/Λ, Λ), and wherein the number of propagation modes can be 4 or less with respect to light having a wavelength of 1050 nm or more in propagation at 300 kW·m or less.

It is possible to enlarge the $A_{eff}$ as large as possible while sufficiently cutting off the fourth higher-order mode or more.

In addition, the air holes are in a region (FIG. 25(b)) surrounded by a polygon having vertices A3 (0.27, 16.06),
C3 (0.60, 20.18),
G (0.69, 22.08),
H (0.68, 23.67),
I (0.70, 24.30),
J (0.70, 32.87), and
K (0.80, 50.00), in the design region, and the quality M2 of the output light can be 3.3 or less with respect to light having a wavelength of 1050 nm or more in propagation at 300 kW·m or less.

It is possible to enlarge the $A_{eff}$ as large as possible while sufficiently cutting off the third higher-order mode or more.

Furthermore, the air holes are in a region (FIG. 25(a)) surrounded by a polygon having vertices A3 (0.27, 16.06),
C3 (0.60, 20.34),
L (0.60, 23.03),
M (0.68, 23.99),
N (0.68, 31.60),
O (0.79, 48.73), and
P (0.80, 50.00), in the design region, and the quality M2 of the output light can be 2 or less with respect to light having a wavelength of 1050 nm or more in propagation at 300 kW·m or less.

It is possible to enlarge the $A_{eff}$ as large as possible while sufficiently cutting off the first higher-order mode or more.

This is an example of a PCF designed by the optical fiber design method.

A PCF has a 7-cell structure in which air holes with diameters d are arranged at intervals Λ in a cross section, wherein an effective area Aeff is 3200 μm² or more, wherein the air holes having diameters d and intervals Λ are included in a design region (FIG. 26(c)) surrounded by a polygon having vertices A4 (0.40, 24.78),
K1 (0.78, 30.66),
L (0.78, 38.29),
M (0.80, 40.12), and
N (0.80, 50.00), when coordinates are represented by (d/Λ, Λ), and wherein the number of propagation modes can be 4 or less with respect to light having a wavelength of 1050 nm or more in propagation at 600 kW·m or less.

It is possible to enlarge the $A_{eff}$ as large as possible while sufficiently cutting off the fourth higher-order mode or more.

In addition, the air holes are in a region (FIG. 26(b)) surrounded by a polygon having vertices A4 (0.40, 24.78),
C4 (0.70, 30.01),
J (0.70, 32.87), and
K (0.80, 50.00), in the design region, and the quality M2 of the output light can be 3.3 or less with respect to light having a wavelength of 1050 nm or more in propagation at 600 kW·m or less.

It is possible to enlarge the $A_{eff}$ as large as possible while sufficiently cutting off the third higher-order mode or more.

Furthermore, the air holes are in a region (FIG. 26(a)) surrounded by a polygon having vertices A4 (0.40, 24.46),
C4 (0.68, 29.56),
N (0.68, 31.60),
O (0.79, 48.73), and
P (0.80, 50.00), in the design region, and the quality M2 of the output light can be 2 or less with respect to light having a wavelength of 1050 nm or more in propagation at 600 kW·m or less.

It is possible to enlarge the $A_{eff}$ as large as possible while sufficiently cutting off the first higher-order mode or more.

This is an example of a PCF designed by the optical fiber design method.

A PCF has a 7-cell structure in which air holes with diameters d are arranged at intervals Λ in a cross-section, wherein an effective area Aeff is 4800 μm² or more, wherein the air holes having diameters d and intervals Λ are included in a design region (FIG. 27(c)) surrounded by a polygon having vertices A5 (0.53, 32.87),
L (0.78, 38.29),
M (0.80, 40.12), and
N (0.80, 50.00), when coordinates are represented by (d/Λ, Λ), and wherein the number of propagation modes can be 4 or less with respect to light having a wavelength of 1050 nm or more in propagation at 900 kW·m or less.

It is possible to enlarge the $A_{eff}$ as large as possible while sufficiently cutting off the fourth higher-order mode or more.

In addition, the air holes are in a region (FIG. 27(b)) surrounded by a polygon having vertices A5 (0.53, 32.87),
C5 (0.73, 37.00), and
K (0.80, 50.00), in the design region, and the quality M2 of the output light can be 3.3 or less with respect to light having a wavelength of 1050 nm or more in propagation at 900 kW·m or less.

It is possible to enlarge the $A_{eff}$ as large as possible while sufficiently cutting off the third higher-order mode or more.

Furthermore, the air holes are in a region (FIG. 27(a)) surrounded by a polygon having vertices

A5 (0.53, 32.87),
C5 (0.72, 36.35),

O (0.79, 48.73), and
P (0.80, 50.00),
in the design region, and
the quality M2 of the output light can be 2 or less with respect to light having a wavelength of 1050 nm or more in propagation at 900 kW·m or less.

It is possible to enlarge the $A_{eff}$ as large as possible while sufficiently cutting off the first higher-order mode or more.

A light transmission using the above-described PCF will be described.

It is the light transmission that propagates light with 1 kW or more from a laser for 10 m or more and outputting the light from the output end, the laser and the output end are connected with a 2-mode fiber of which the number of propagation modes is 2 at the wavelength of the light, and the light is propagated by setting an excitation ratio of the first higher-order mode of the 2-mode fiber to be 50% or less.

The 2-mode fiber has larger $A_{eff}$ compared with the single-mode fiber. For this reason, since the SRS can be suppressed, the propagation distance of the high-power light can be extended. Furthermore, since the excitation ratio of the first higher-order mode of the 2-mode fiber can be adjusted by the optical axis between the laser and the optical fiber, it is possible to transmit the high-power light with desired beam quality.

More specifically, the light transmission according to the present invention is a light transmission of propagating light with 1 kW or more from a laser for 10 m or more and outputting the light from the output end, the laser and the output end are connected with a 4-mode fiber of which the number of propagation modes is 4 or less at wavelength of the light, and the light is propagated by setting an excitation ratio of the third higher-order mode of the 4-mode fiber to be 30% or less.

The 4-mode fiber has larger $A_{eff}$ compared with the single-mode fiber. For this reason, since the SRS can be suppressed, the propagation distance of high-power light can be extended. Furthermore, since the excitation ratio of the first higher-order mode and the second higher-order mode of the 4-mode fiber can be reduced by the optical axis between the laser and the optical fiber and the excitation ratio of the third higher-order mode can be adjusted by a mode field diameter of the optical fiber and a spot size of the light coupled to the optical fiber, it is possible to transmit the high power light with desired beam quality.

Therefore, it is possible to realize a light transmission capable of satisfying desired requirements of an output power, a propagation distance, and a beam quality in a PCF designed by the optical fiber design method according to the present invention.

Advantageous Effect of Invention

According to the present invention, it is possible to provide an optical fiber design method of designing an optical fiber that can satisfy desired requirements of an output power, a propagation distance, and a beam quality and the optical fiber.

DESCRIPTION OF EMBODIMENTS

Figure 1:
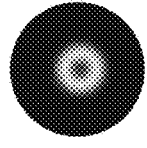
FIG. 1 is a diagram illustrating an example of a waveguide mode of an optical fiber.
Figure 1:
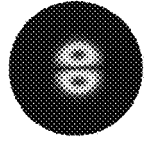
Figure 1:
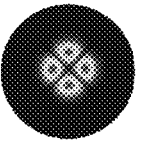
Figure 1:
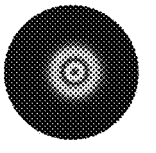
Figure 1:
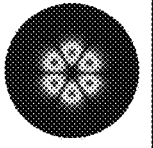
Figure 2:
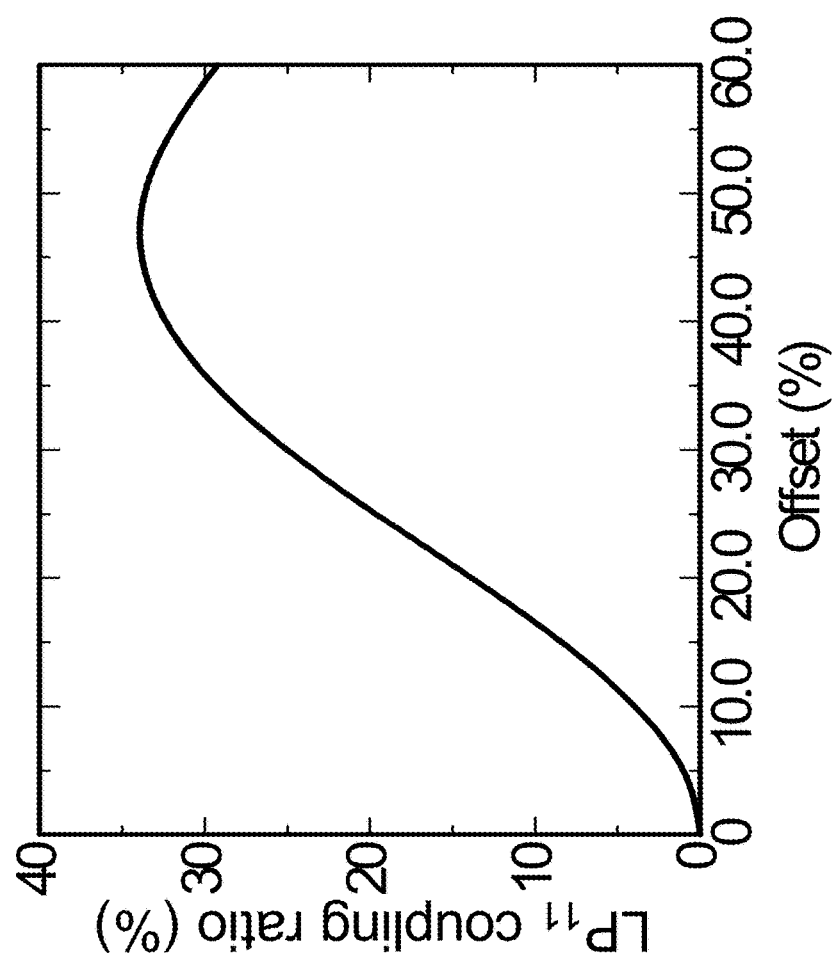
FIG. 2 is a diagram for explaining excitation efficiency with respect to axis shift from LP01 to LP11.

Embodiments of the present invention will be described with reference to the accompanying drawings. The embodiments described hereinafter are examples of the present invention, and the present invention is not limited to the following embodiments. In addition, in this specification and the drawings, the same components are denoted by the same reference numerals.

Embodiment 1

Characteristics of the present invention are to increase an output power and to extend a propagation distance by enlarging $A_{eff}$. A major difference of the present invention from the related art is that an optical fiber has a structure capable of propagating a plurality of modes. The present invention sufficiently reduces an efficiency at which the higher-order mode is excited in an input unit and clarifies a region where $M^2$ can be made sufficiently small, so that $A_{eff}$ can be set to a value that cannot be realized in the related art.

Therefore, first, the $M^2$ value which is an index of beam quality is described below. In the embodiment of the present invention, description will be made on the basis of each waveguide mode illustrated in FIG. 1.

The $M^2$ values for the waveguide modes of the optical fiber are disclosed to be 1.1 for the fundamental mode, 3.3 for the first higher-order mode, 3.3 for the second higher-order mode, and 3.1 for the third higher-order mode in Non Patent Literature 6. In addition, it is disclosed that, in a case where the fundamental mode and the first higher-order mode coexist, the $M^2$ value varies depending on a phase relationship between an excitation ratio of the first higher-order mode and the fundamental mode, and it can be understood that, if the excitation ratio of the first higher-order mode is lower than about 50%, the $M^2$ value becomes 2.0 or less.

A first beam propagation method according to the embodiment is a light transmission of propagating light with 1 kW or more from a laser for 10 m or more and outputting the light from an output end, the laser and the output end are connected with a 2-mode fiber of which the number of propagation modes is 2 at the wavelength of the light, and the light is propagated by setting an excitation ratio of the first higher-order mode of the 2-mode fiber to be 50% or less.

In the first higher-order mode, the excitation ratio varies depending on an amount of axis shift from the center of the optical fiber when light is generally input to the optical fiber. In addition, reduction of the excitation ratio of the first higher-order mode down to 50% or less can be sufficiently realized with existing optical input/output alignment (optical axis alignment) technology.

Accordingly, if a 2-mode fiber in which the second higher-order mode is cut off and only the fundamental mode and the first higher-order mode exist is used, by appropriately controlling the excitation ratio, high-quality beam propagation with an $M^2$ value of 2.0 or less which cannot be realized with the multi-mode fiber in the related art becomes possible, and fiber design greatly exceeding $A_{eff}$ which cannot be realized with the single-mode fiber in the related art becomes possible. In addition, the worst value of the $M^2$ value of the 2-mode fiber in which only the fundamental mode and the first higher-order mode exist is 3.3, and fiber design of enabling relatively high-quality beam propagation in comparison with the multi-mode optical fiber is possible.

Figure 4:
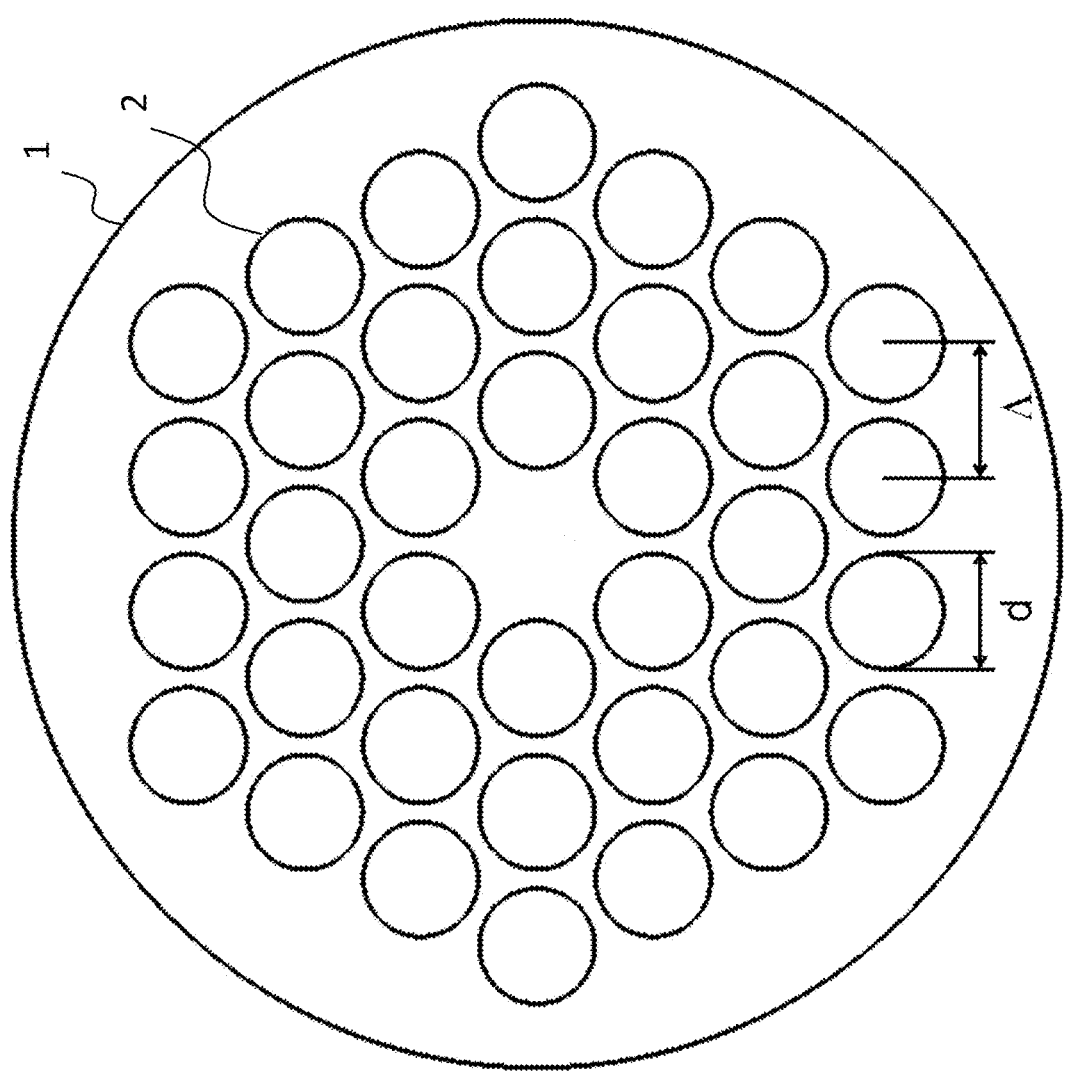
FIG. 4 is a diagram illustrating an example of a cross section of a PCF having a 1-cell structure.

The basis of the worst value of the $M^2$ value of the 2-mode fiber is illustrated in FIG. 4 of Non Patent Literature 6. In this figure, $M^2$ denotes the excitation ratio of the LP01 mode of a case where the LP01 (fundamental mode) and the LP11 mode (first higher-order mode) coexist, and $M^2$ is 3.3 when a (excitation ratio of the LP11 mode) is 1.0. In addition, unless the LP11 mode is intentionally excited, the LP11 mode will not be excited 100%, so that the worst value of the $M^2$ value of the 2-mode fiber is 3.3.

A second beam propagation method according to the embodiment is a light transmission of propagating light with 1 kW or more from a laser for 10 m or more and outputting the light from the output end, the laser and the output end are connected with a 4-mode fiber of which the number of propagation modes is 4 at the wavelength of light, and the light is propagated by setting an excitation ratio of the third higher-order mode of the 4-mode fiber to be 30% or less.

Figure 3:
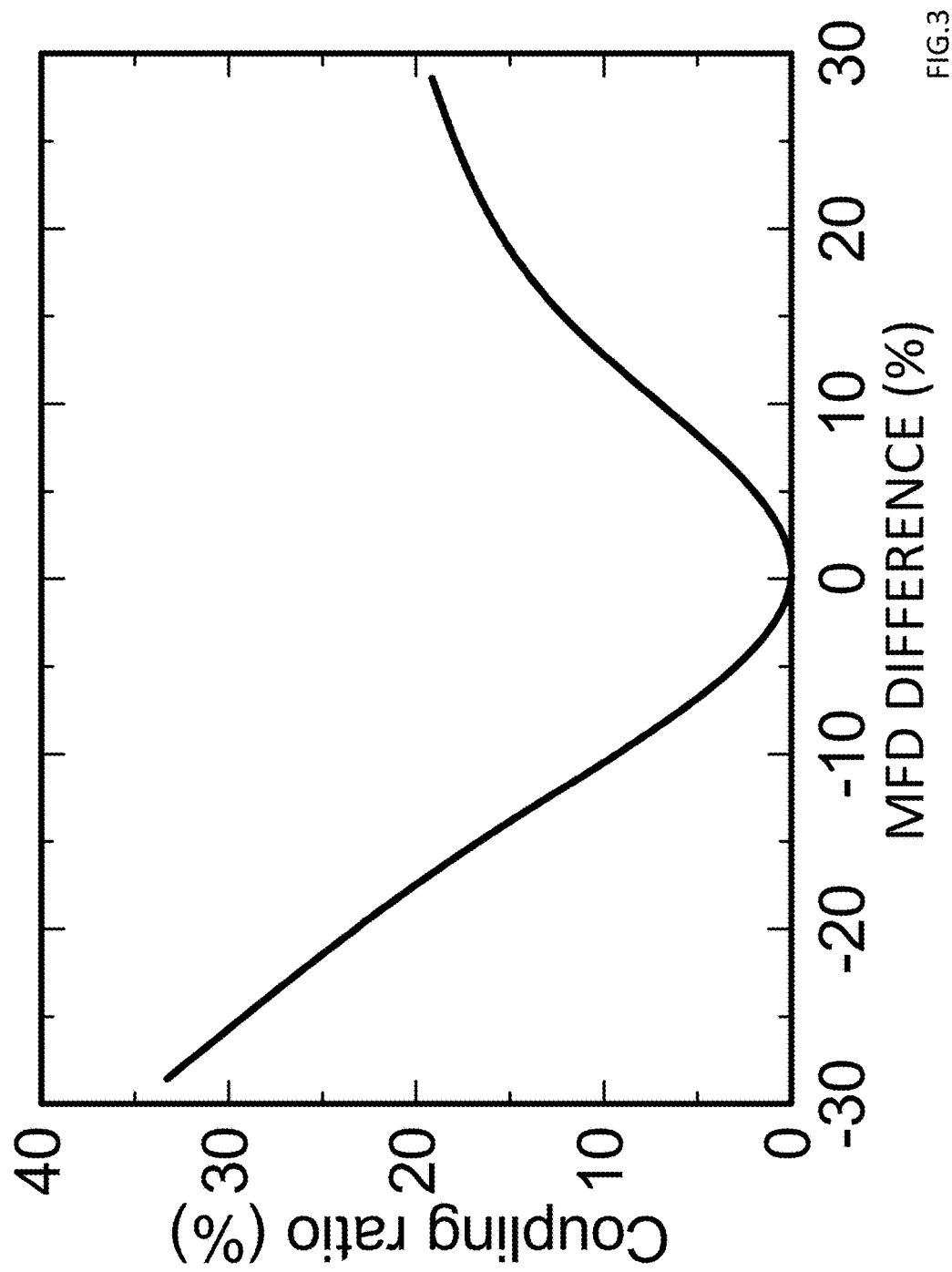
FIG. 3 is a diagram illustrating an example of an MFD difference of the optical fiber and an efficiency of exciting a third higher-order mode from a fundamental mode.

Non Patent Literature 6 also discloses an $M^2$ value when the fundamental mode and the third higher-order mode coexist, and thus, it can be understood that, if the excitation ratio of the third higher-order mode is lower than about 30%, the $M^2$ value becomes 2 or less. The fundamental mode and the third higher-order mode are modes having the electric field peak at the center of the fiber, and the coupling efficiency varies depending on a spot size (MFD 2) of the light input to the fiber having a mode field diameter (MFD 1). FIG. 3 is a diagram illustrating a relationship between an MFD difference and an efficiency (rate of occurrence of the third higher-order mode) of excitation of the third higher-order mode when the vertical axis represents the efficiency of excitation of the third higher-order mode and the horizontal axis represents the MFD difference ((MFD2−MFD1)/MFD1) input to the fiber.

From FIG. 3, it is possible to reduce the occurrence of the third higher-order mode to about 30% or less by suppressing the MFD difference within 20% or by inputting a beam having a spot size more than the MFD 1 of the fiber, so that the $M^2$ value can be reduced to 2 or less. More specifically, since the third higher-order mode occurs according to the distance between the optical fibers (corresponding to a difference in beam diameter between input light and a fundamental mode of a 4-mode optical fiber), the distance between the fiber laser and the 4-mode optical fiber is adjusted. In addition, the first higher-order mode and the second higher-order mode are higher-order modes which occur due to axis shift of the fiber laser and the optical fiber and can be sufficiently suppressed from results of an axis shift and an excitation amount of the first higher-order mode.

From the above description, by appropriately controlling the excitation ratio by using the 4-mode fiber where the fourth higher-order mode is cut off, it is possible to design a fiber where high-quality beam propagation with an $M^2$ value of 2.0 or less is possible. Furthermore, since the worst value of the $M^2$ value of the 4-mode fiber is 3.3, it is possible to design a fiber that enables relatively high-quality beam propagation with an $M^2$ value of at worst 3.3 or less.

Figure 6:
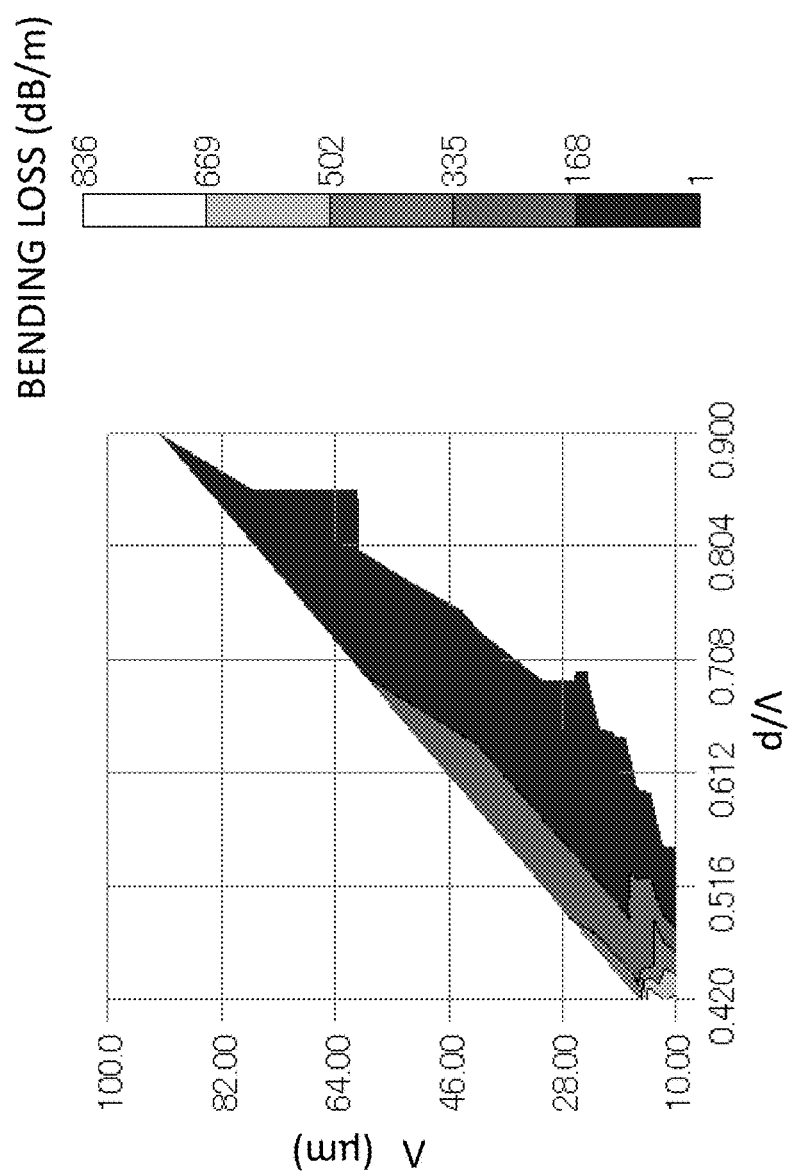
FIG. 6 is a diagram for explaining a region (cut-off region) where a bending loss in the first higher-order (LP11) mode of light having a wavelength of 1070 nm in a 1-cell structure PCF is 1 dB/m or more.

In addition, the ground for the worst value of the $M^2$ value of the 2-mode fiber is illustrated in FIG. 6 of Non Patent Literature 6. In this figure, $M^2$ is illustrated with respect to the excitation ratio of LP02 mode in a case where LP01 (fundamental mode) and LP02 mode (third higher-order mode) coexist, and when a (excitation ratio of LP02 mode) is 0.9, the $M^2$ is 3.3. Therefore, the worst value of the $M^2$ value of the 4-mode fiber is 3.3.

In the propagation of only the single-mode, there exists a limit to enlargement of $A_{eff}$, but as in the light transmission described in the embodiment, the propagation of several modes is permitted and the design range is widened by using a 2-mode fiber or a 4-mode fiber, so that it is possible to realize the $A_{eff}$ which does not exist in the related art. Therefore, by using the light transmission according to the embodiment, it is possible to propagate light satisfying the desired requirements of an output power, a propagation distance, and a beam quality.

Embodiment 2

This embodiment relates to a design method of structural parameters (diameters d of the air hole 2 and intervals Λ between the air holes 2) for realizing enlargement of an effective area $A_{eff}$ and implementing a predetermined bending loss αb in a PCF having a 1-cell core structure having air holes 2 illustrated in FIG. 4. In the embodiment, a minimum bending radius in a fundamental mode and a bending radius defining an effective cutoff of a higher-order mode are described as 140 mm, but the method according to the embodiment is not limited thereto.

The design method includes:

a specification value determining step of determining fiber loss and Raman gain coefficient of a photonic crystal fiber (PCF) to be used, a wavelength of propagating light, a beam quality $M^2$ after PCF propagation, a laser output power value, a propagation distance and a minimum bending radius;

propagation modesmaximum number of propagation modes calculating step of calculating the number n of propagation modes that can be propagated by using Mathematical Formula 1;

an effective area calculating step of calculating an effective area $A_{eff}$ from the fiber loss and the Raman gain coefficient by using Mathematical Formula 2;

a fiber structure calculating step of calculating diameter d and interval Λ of air holes of the PCF having the $A_{eff}$ or more and plotting points having the $A_{eff}$ or more on a graph of which the horizontal axis is d/Λ and of which the vertical axis is Λ;

a bending loss calculating step of calculating a bending loss at a minimum bending radius of a smallest higher-order mode cut off by the PCF from the diameter d and the interval Λ of the air holes of the PCF and plotting points having the bending loss of 1 dB/m or more on a graph of which the horizontal axis is d/Λ and of which the vertical axis is Λ; and a structure determining step of detecting an overlapping range where a region of the points plotted on the graph in the fiber structure calculating step and a region of the points plotted on the graph in the bending loss calculating step overlap each other and determining a PCF structure having air holes having diameters d and intervals Λ in the overlapping range.

Mathematical Formulas 1 and 2 will be described later.

As illustrated in FIG. 4, the optical fiber according to the embodiment is a photonic crystal fiber (PCF) having a 1-cell structure which has a core portion and a cladding portion that surrounds the core portion, wherein the core portion and the cladding portion are made of a medium having a uniform optical refractive index, and a plurality of uniform air holes 2 are formed in the cladding portion in the longitudinal direction. In addition, the 1-cell structure in the present invention denotes a structure of a photonic crystal having one defect, in which only the air holes in the central portion of the photonic crystal formed with the air holes arranged in a triangular lattice shape are made of quartz.

Figure 5:
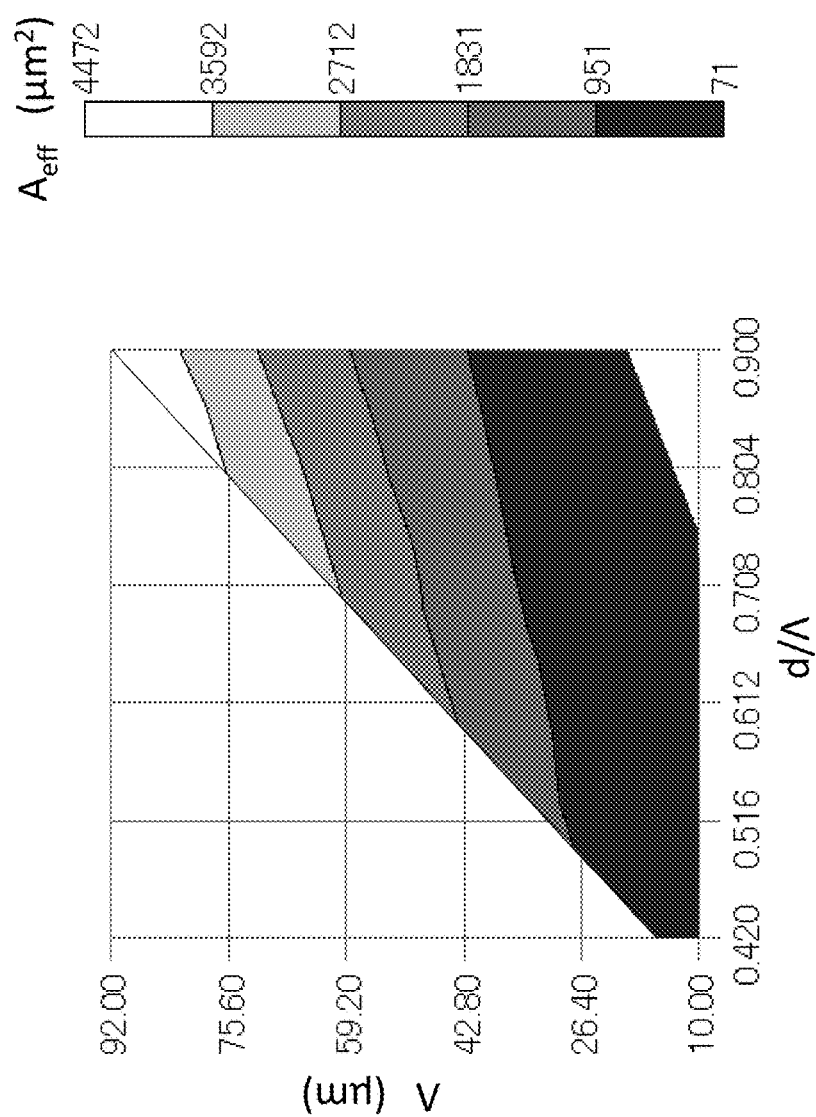
FIG. 5 is a diagram for explaining a relationship between $d/\Lambda$, $\Lambda$, and $A_{eff}$ that satisfy a bending loss of 0.1 dB/m or less when light having a wavelength of 1070 nm is propagated in a fundamental mode with a PCF having a 1-cell structure.

FIG. 5 is a diagram illustrating a range of the $A_{eff}$ of the PCF in the region where the bending loss in the fundamental mode with a bending radius of 140 mm is 1.0 dB/m or less with respect to light having a wavelength of 1070 nm when the horizontal axis represents d/Λ and the vertical axis represents Λ. The bending radius and the bending loss value in the fundamental mode are not limited to the definition and the specified value according to the present invention, but it is possible to determine the parameters used for the design according to the required characteristics. The $A_{eff}$ is obtained by using the following Mathematical Formula.

[Mathematical Formula 3]

$$A_{eff} = \frac{\left[\int\int |E(x,y)|^2 dxdy\right]^2}{\int\int |E(x,y)|^4 dxdy} \quad (3)$$

Herein, E is the electric field of light, and x and y are the coordinates in the fiber cross section (assumed to be the xy plane).

FIG. 6 illustrates the bending loss in the first higher-order mode at a bending radius of 140 mm of the 1-cell structure PCF with respect to light having a wavelength of 1070 nm when the horizontal axis represents d/Λ and the vertical axis represents Λ. The plotted range in the figure illustrates the bending loss in the first higher-order mode in the range of 1 dB/m or more (the range in which the cutoff is obtained). By setting to d/Λ and Λ where the range illustrated in FIG. 5 and the range illustrated in FIG. 6 overlap each other, the first higher-order mode or more is sufficiently cut off, and thus, it is possible to select a region where the $A_{eff}$ is large. For example, when the coordinates are represented by (d/Λ, Λ), the air holes are set to d and Λ in a region surrounded by a polygon having four vertices A (0.42, 16),
B (0.42, 10),
C (0.53, 10), and
D (0.80, 56).

More specifically, it can be understood from FIG. 6 that, if d/Λ is 0.724 and Λ is about 45 μm, $A_{eff}$ is 1400 μm², and the bending loss in the first higher-order mode is 40 dB/m or more, namely, the structure which d/Λ is 0.724 and Λ is about 45 μm becomes a single mode effectively.

Figure 7:
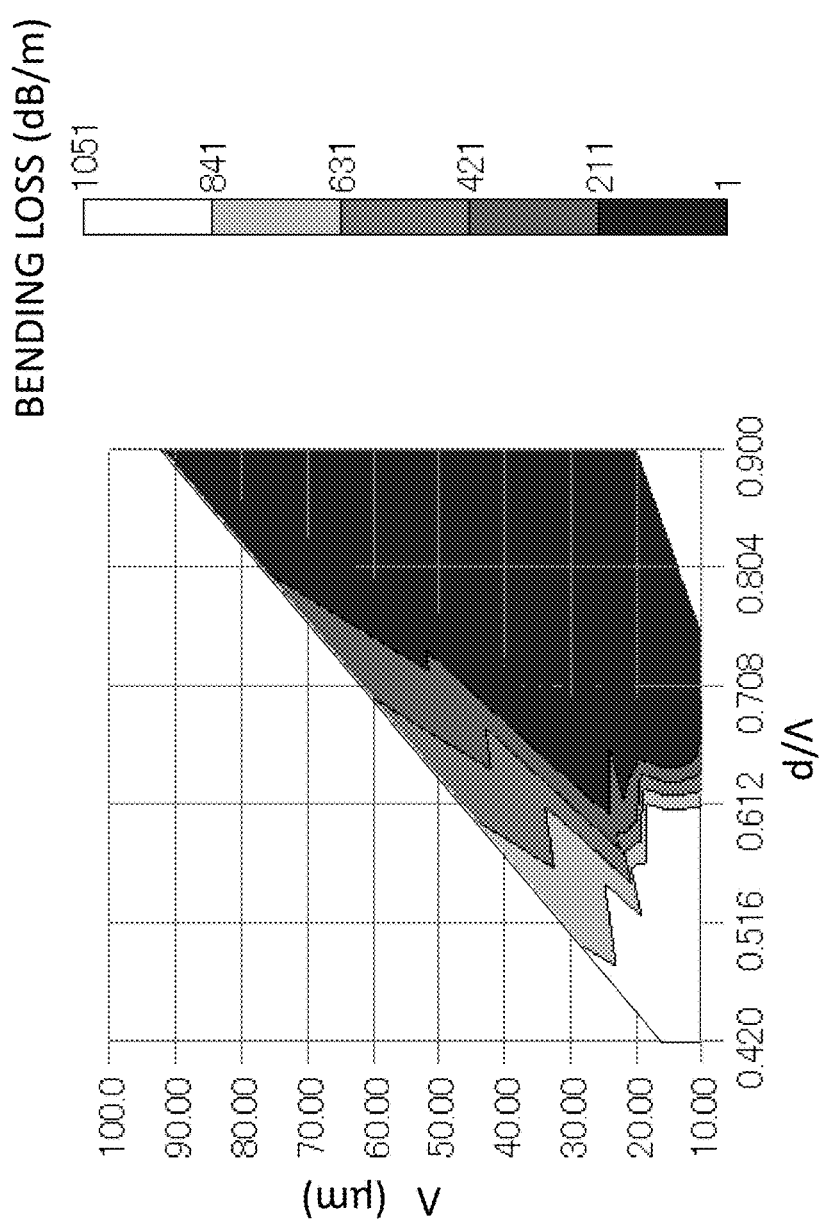
FIG. 7 is a diagram for explaining a region (cut-off region) where a bending loss in the second higher-order (LP 21) mode of light having a wavelength of 1070 nm in a 1-cell structure PCF is 1 dB/m or more.

FIG. 7 illustrates the bending loss (1 dB/m or more) in the second higher-order mode at a bending radius of 140 mm of the 1-cell structure PCF with respect to light having a wavelength of 1070 nm when the horizontal axis represents d/Λ and the vertical axis represents Λ. By setting to d/Λ and Λ where the range illustrated in FIG. 5 and the range illustrated in FIG. 7 overlap each other, the second higher-order mode or more is sufficiently cut off, and thus, it is possible to select a region where the $A_{eff}$ is large. For example, when the coordinates are represented by (d/Λ, Λ), the air holes are set to d and Λ in a region surrounded by a polygon having four vertices A (0.42, 16),
B (0.42, 10),
C (0.76, 10), and
D (0.80, 56).

Figure 8:
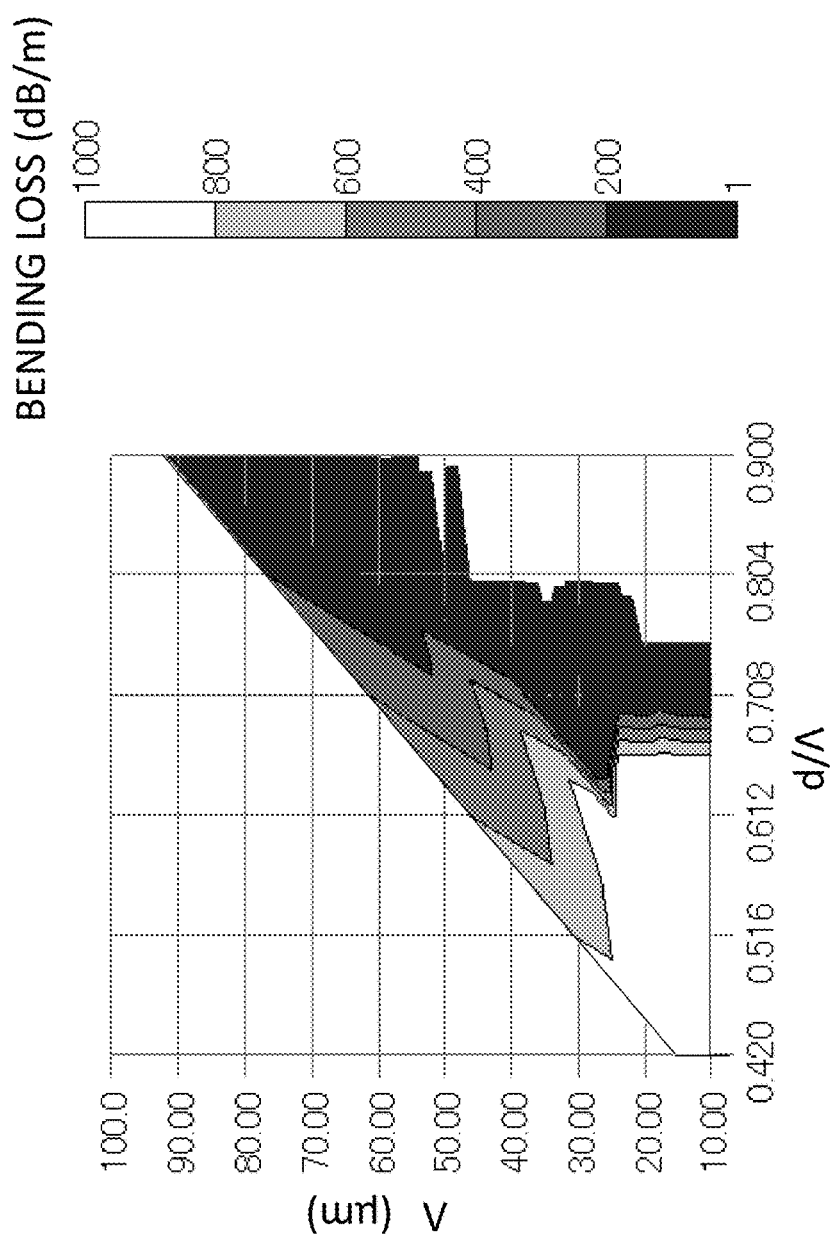
FIG. 8 is a diagram for explaining a region (cut-off region) where a bending loss in the third higher-order (LP02) mode of light having a wavelength of 1070 nm in a 1-cell structure PCF is 1 dB/m or more.

In addition, FIG. 8 illustrates the bending loss (1 dB/m or more) in the third higher-order mode at a bending radius of 140 mm of the 1-cell structure PCF with respect to light having a wavelength of 1070 nm when the horizontal axis represents d/Λ and the vertical axis represents Λ. By setting to d/Λ and Λ where the range illustrated in FIG. 5 and the range illustrated in FIG. 8 overlap each other, the third higher-order mode or more is sufficiently cut off, and thus, it is possible to select a region where the $A_{eff}$ is large. For example, when the coordinates are represented by (d/Λ, Λ), the air holes are set to d and Λ in a region surrounded by a polygon having four vertices A (0.42, 16),
B (0.42, 10),
C (0.76, 10), and
D (0.80, 56).

Figure 9:
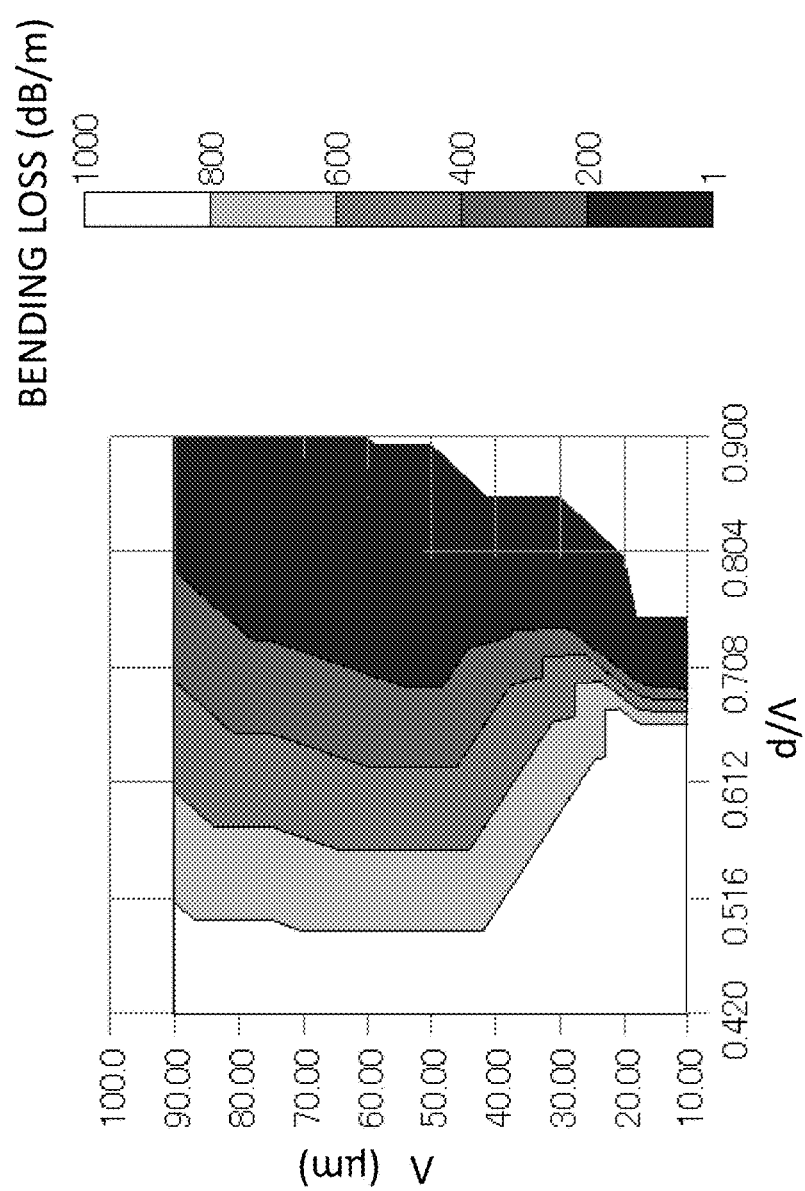
FIG. 9 is a diagram for explaining a region (cut-off region) where a bending loss in the fourth higher-order (LP 31) mode of light having a wavelength of 1070 nm in a 1-cell structure PCF is 1 dB/m or more.

In addition, FIG. 9 illustrates the bending loss (1 dB/m or more) in the fourth higher-order mode at a bending radius of 140 mm of the 1-cell structure PCF with respect to light having a wavelength of 1070 nm when the horizontal axis represents d/Λ and the vertical axis represents Λ. By setting to d/Λ and Λ where the range illustrated in FIG. 5 and the range illustrated in FIG. 9 overlap each other, the fourth higher-order mode or more is sufficiently cut off, and thus, it is possible to select a region where the $A_{eff}$ is large. For example, when the coordinates are represented by (d/Λ, Λ), the air holes are set to d and Λ in a region surrounded by a polygon having four vertices A (0.42, 16),
B (0.42, 10),
C (0.76, 10), and
D (0.80, 56).

By setting to d/Λ and Λ where the range illustrated in FIG. 5 and the range illustrated in FIG. 7, FIG. 8 or FIG. 9 overlap each other as described above, the second higher-order mode or more, the third higher-order mode or more, or the fourth higher-order mode or more is sufficiently cut off, and thus, it is possible to select a region where the $A_{eff}$ is large.

Figure 10:
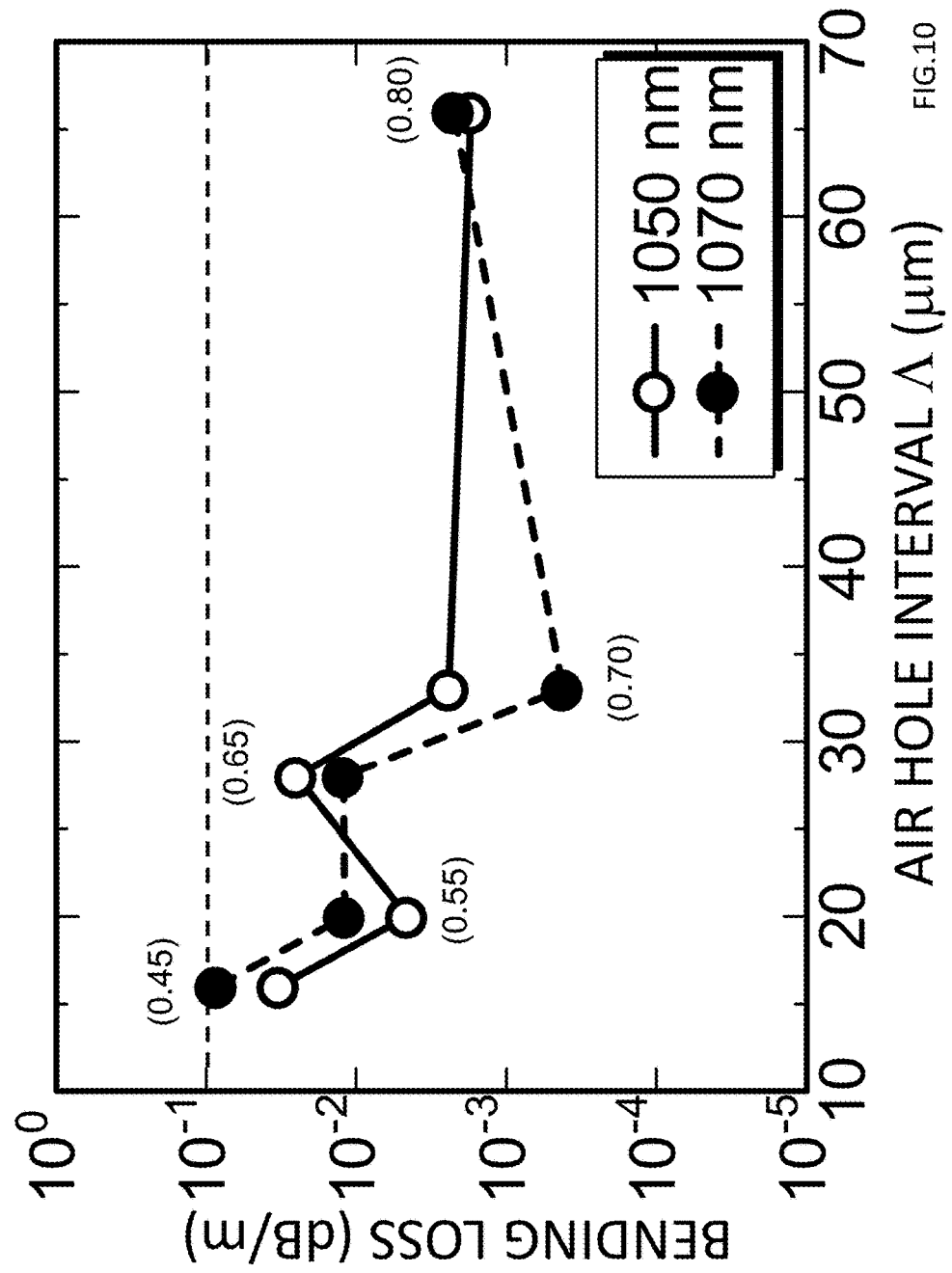
FIG. 10 is a diagram for explaining structure dependency of 1050 nm and 1070 nm of a bending loss in the fundamental mode of a PCF having a 1-cell structure.

FIG. 10 illustrates wavelength dependency of a bending loss of a PCF with a 1-cell structure. In the figure, the solid line (open circles) and the broken line (black circles) illustrate air hole interval (Λ) dependency of the bending loss in the fundamental mode for the wavelength 1050 nm and the wavelength 1070 nm, respectively, as, and the values in parentheses in the figure indicate values of d/Λ for each Λ. It is generally known that the PCF has characteristics in that the $A_{eff}$ has almost the same value regardless of the propagation wavelength and the bending loss increases as the wavelength becomes shorter. FIG. 10 illustrates that the structure illustrated in this design is realized in any structure where the bending loss in the fundamental mode is 0.1 dB/m or less even at a wavelength of 1050 nm and that the present design is effective at a wavelength of 1050 nm or more.

Embodiment 3

Figure 11:
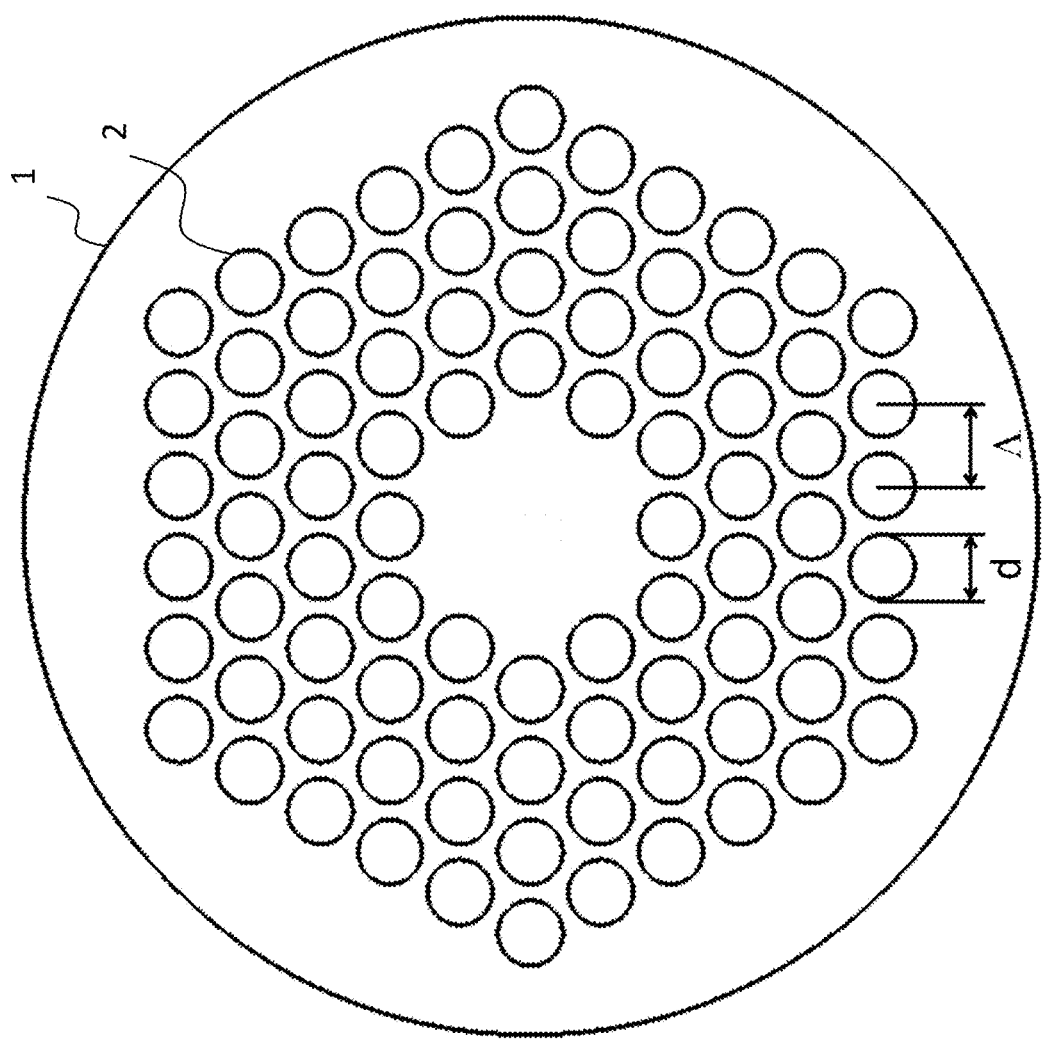
FIG. 11 is a diagram illustrating an example of a cross section of a PCF having a 7-cell structure.

This embodiment relates to a design method of structural parameters (diameters d of the air hole 2 and intervals Λ between the air holes 2) for realizing enlargement of $A_{eff}$ and implementing a predetermined bending loss αb in a PCF having a 7-cell core structure having a plurality of air holes 2 as illustrated in FIG. 11. This design method also employs the design method described in the second embodiment.

As illustrated in FIG. 11, the optical fiber according to the embodiment is a PCF having a 7-cell structure which has a core portion and a cladding portion that surrounds the core portion, wherein the core portion and the cladding portion are made of a medium having a uniform optical refractive index, and a plurality of uniform air holes 2 are formed in the cladding portion in the longitudinal direction. In addition, the 7-cell structure in the present invention denotes a structure of a photonic crystal having seven defects, in which one air hole in the central portion of the photonic crystal formed with the air holes arranged in a triangular lattice shape and six air holes around the air hole are made of quartz.

Figure 12:
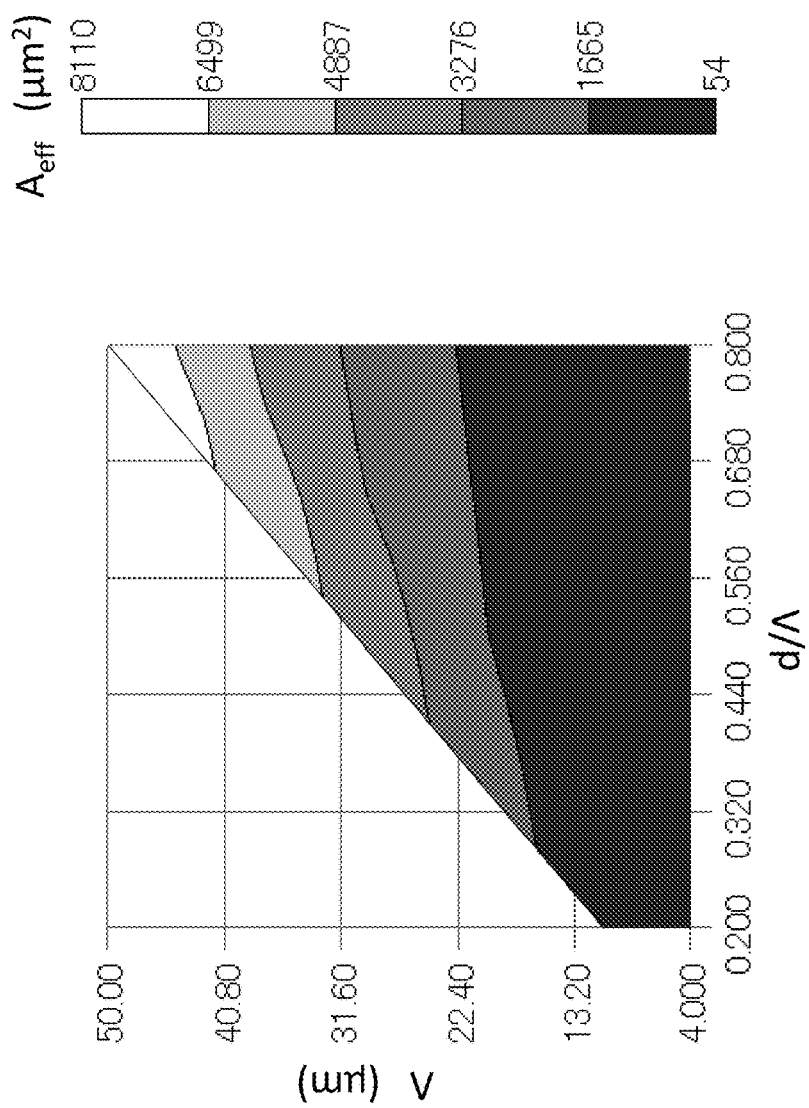
FIG. 12 is a diagram for explaining a relationship between $d/\Lambda$, $\Lambda$, and $A_{eff}$ that satisfy a bending loss of 0.1 dB/m or less when light having a wavelength of 1070 nm is propagated in a fundamental mode with a PCF having a 7-cell structure.

FIG. 12 is a diagram illustrating $A_{eff}$ in a region where the bending loss in the fundamental mode at a bending radius of 140 mm is 1.0 dB/m or less when the horizontal axis represents d/Λ and the vertical axis represents Λ. Since the PCF according to the embodiment has a 7-cell structure, in comparison with the 3-layer structure of the 1-cell structure of Embodiment 1, it is advantageous in that the fiber outer diameter can be reduced in a region where $A_{eff}$ is 1000 μm² or more. In the 3-layer 1-cell structure, a cladding diameter of 500 μm is required to achieve the $A_{eff}$ of 1000 μm², whereas in the 4-layer 7-cell structure, it can be realized with an outer diameter of about 200 μm. The definition of the bending loss value and cutoff in the fundamental mode is not limited to the definition and the specified value of the present invention, but it is possible to determine parameters used for the design according to the required characteristics.

Figure 13:
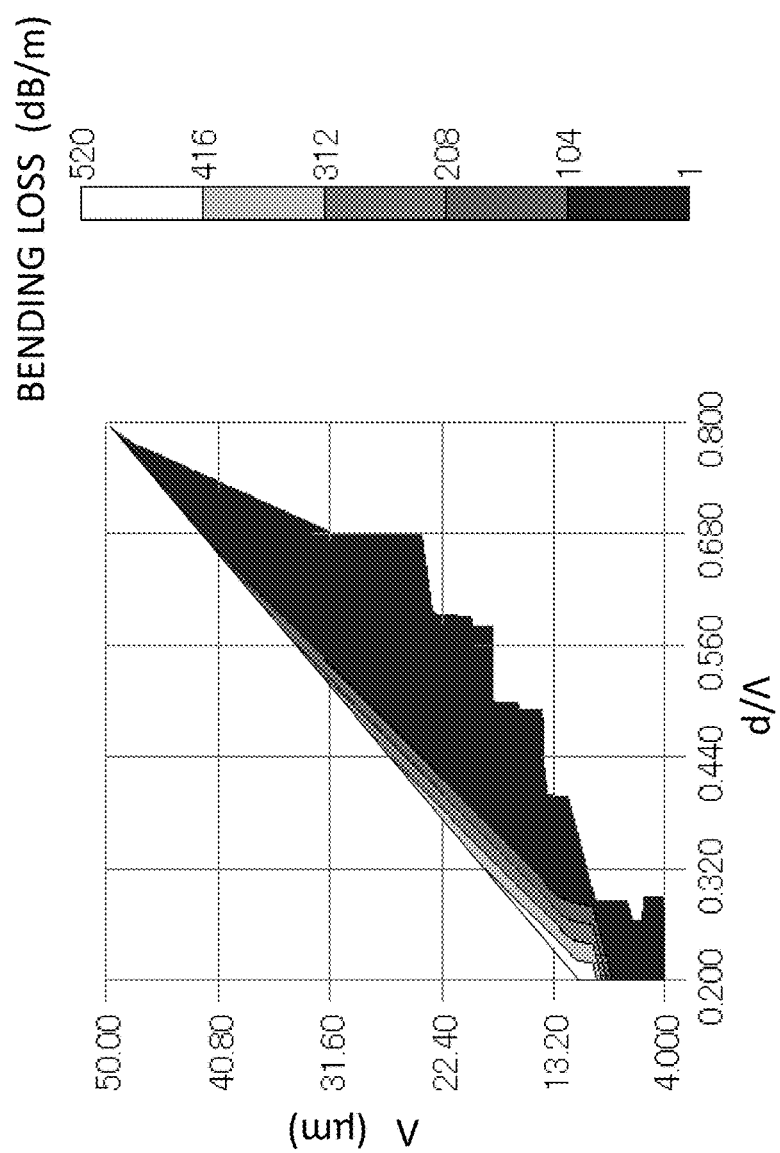
FIG. 13 is a diagram for explaining a region (cut-off region) where a bending loss in the first higher-order (LP11) mode of light having a wavelength of 1070 nm in a 7-cell structure PCF is 1 dB/m or more.

FIG. 13 illustrates the bending loss in the first higher-order (LP11) mode at a bending radius of 140 mm of the 7-cell structure PCF with respect to light having a wavelength of 1070 nm when the horizontal axis represents d/Λ and the vertical axis represents Λ. The plotted range in the figure illustrates the bending loss in the first higher-order mode in the range of 1 dB/m or more (the range in which the cutoff is obtained). By setting to d/Λ and Λ where the range illustrated in FIG. 12 and the range illustrated in FIG. 13 overlap each other, the first higher-order mode or more is sufficiently cut off, and thus, it is possible to select a region where the $A_{eff}$ is large. For example, when the coordinates are represented by (d/Λ, Λ), the air holes are set to d/Λ and Λ in a region surrounded by a triangle having three vertices A (0.20, 7.80),
B (0.34, 10.82), and
C (0.78, 48.42).

More specifically, it can be understood that, if d/Λ is 0.68 and Λ is about 40 μm, $A_{eff}$ is 5700 μm² and the bending loss in the first higher-order mode is 20 dB/m or more, namely, the structure which d/Λ is 0.68 and Λ is about 40 μm becomes a single mode effectively.

Figure 14:
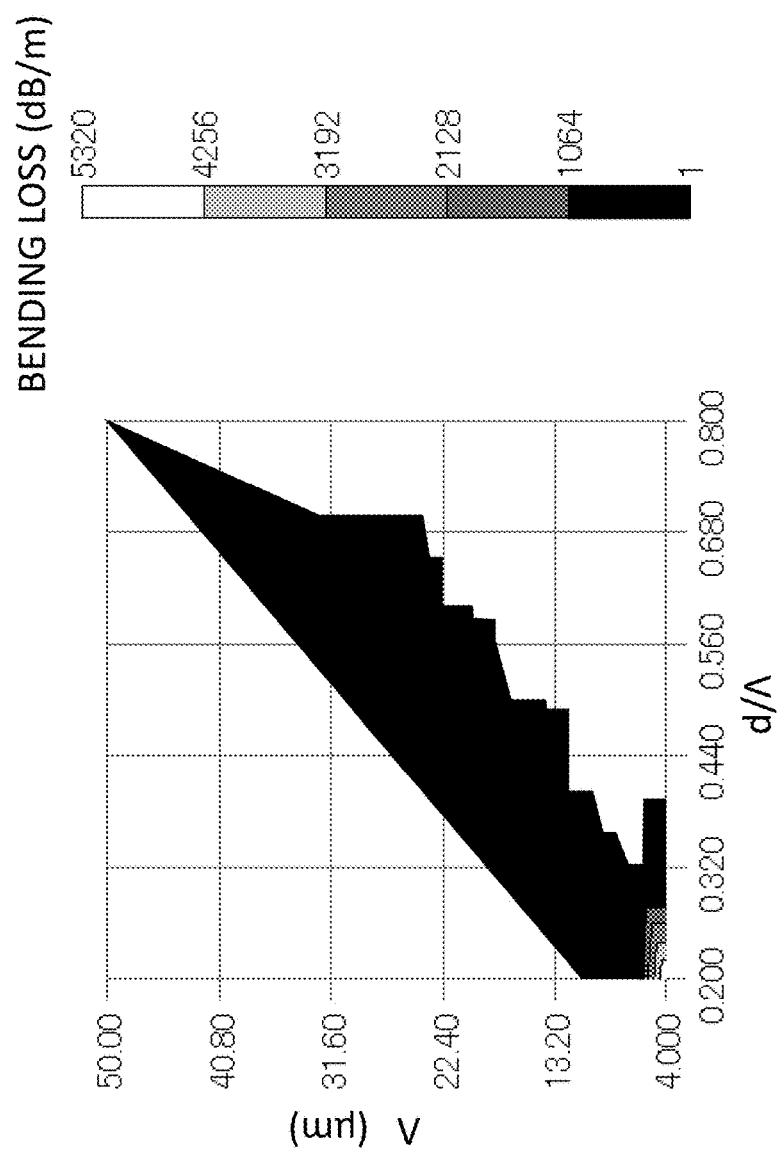
FIG. 14 is a diagram for explaining a region (cut-off region) where a bending loss in the second higher-order (LP 21) mode of light having a wavelength of 1070 nm in a 7-cell structure PCF is 1 dB/m or more.

FIG. 14 illustrates the bending loss (1 dB/m or more) in the second higher-order mode at a bending radius of 140 mm of the 7-cell structure PCF with respect to light having a wavelength of 1070 nm when the horizontal axis represents d/Λ and the vertical axis represents Λ. By setting to d/Λ and Λ where the range illustrated in FIG. 12 and the range illustrated in FIG. 14 overlap each other, the second higher-order mode or more is sufficiently cut off, and thus, it is possible to select a region where the $A_{eff}$ is large. For example, when the coordinates are represented by (d/Λ, Λ), the air holes are set to d/Λ and Λ in a region surrounded by a polygon having four vertices A (0.20, 7.80),
B (0.20, 4.00),
C (0.80, 4.00), and
D (0.80, 50.0).

Figure 15:
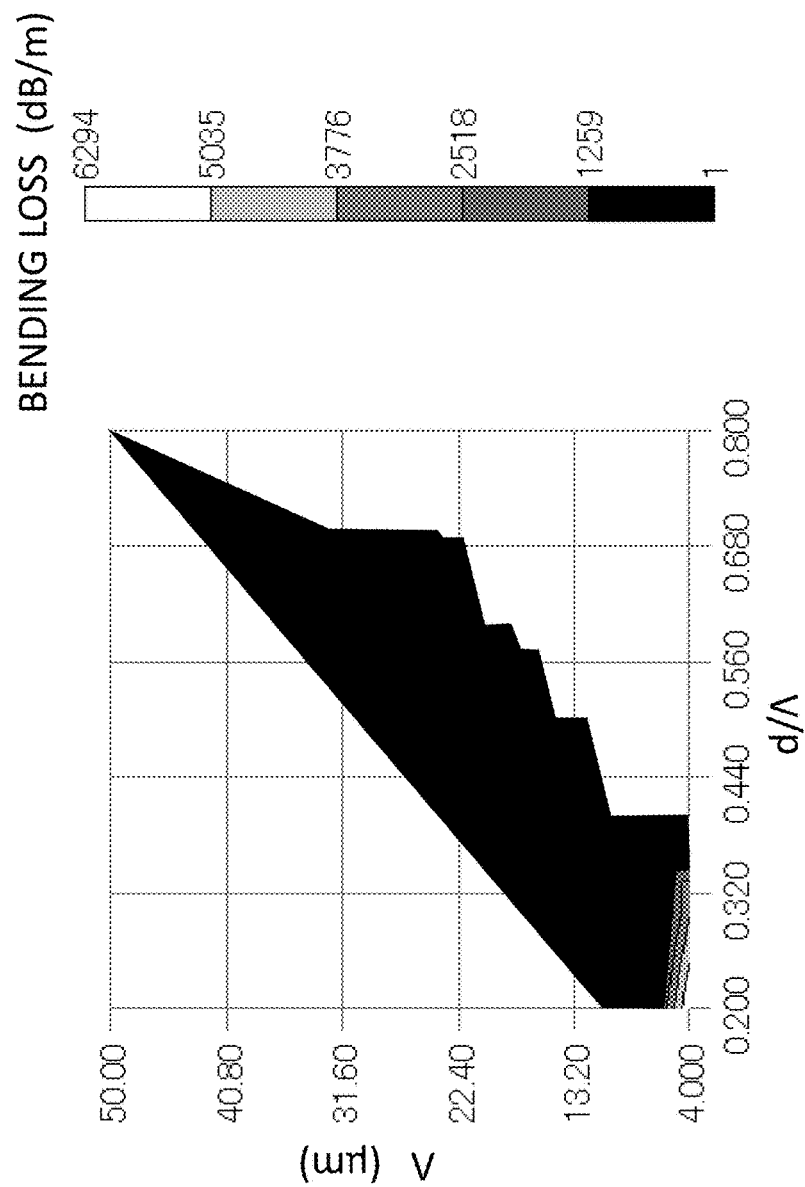
FIG. 15 is a diagram for explaining a region (cut-off region) where a bending loss in the third higher-order (LP02) mode of light having a wavelength of 1070 nm in a 7-cell structure PCF is 1 dB/m or more.

In addition, FIG. 15 illustrates the bending loss (1 dB/m or more) in the third higher-order mode at a bending radius of 140 mm of the 1-cell structure PCF with respect to light having a wavelength of 1070 nm when the horizontal axis represents d/Λ and the vertical axis represents Λ. By setting to d/Λ and Λ where the range illustrated in FIG. 12 and the range illustrated in FIG. 15 overlap each other, the third higher-order mode or more is sufficiently cut off, and thus, it is possible to select a region where the $A_{eff}$ is large. For example, when the coordinates are represented by (d/Λ, Λ), the air holes are set to d/Λ and Λ in a region surrounded by a polygon having four vertices A (0.20, 7.80),
B (0.20, 4.00),
C (0.80, 4.00), and
D (0.80, 50.0).

Figure 16:
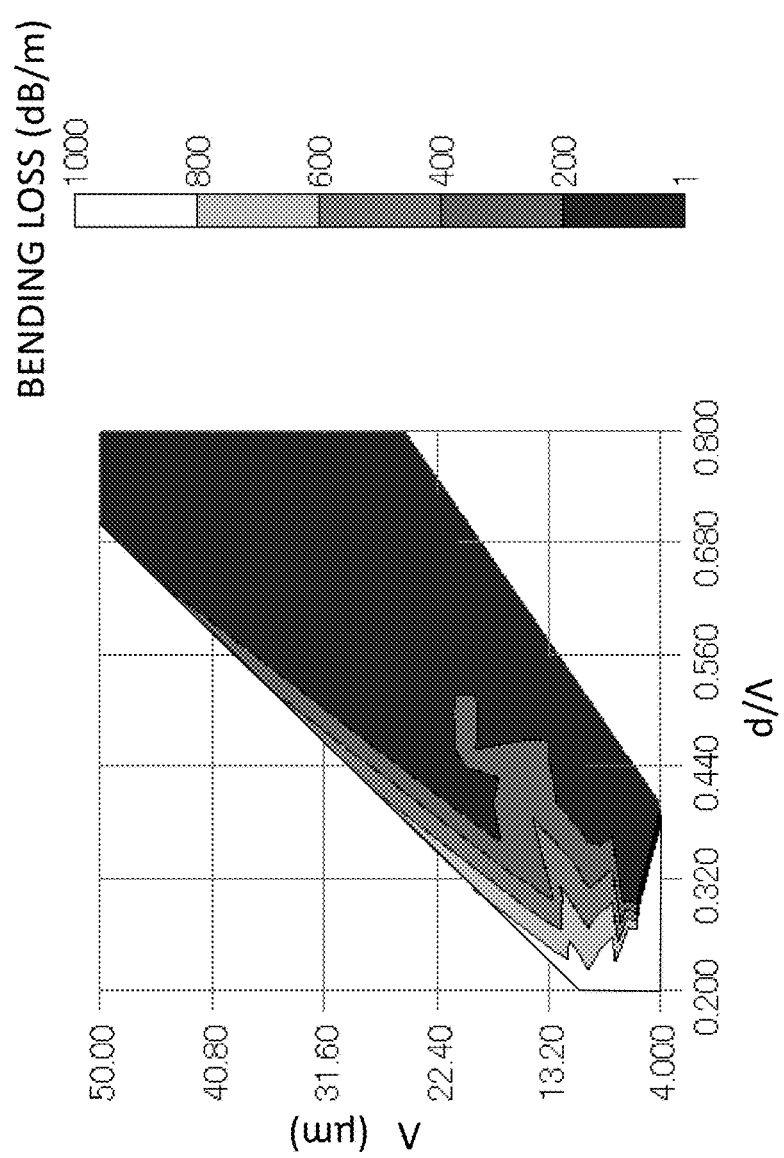
FIG. 16 is a diagram for explaining a region (cut-off region) where a bending loss in the fourth higher-order (LP 31) mode of the light having a wavelength of 1070 nm in a 7-cell structure PCF is 1 dB/m or more.

In addition, FIG. 16 illustrates the bending loss (1 dB/m or more) in the fourth higher-order mode at a bending radius of 140 mm of the 1-cell structure PCF with respect to light having a wavelength of 1070 nm when the horizontal axis represents d/Λ and the vertical axis represents Λ. By setting to d/Λ and Λ where the range illustrated in FIG. 12 and the range illustrated in FIG. 16 overlap each other, the fourth higher-order mode or more is sufficiently cut off, and thus, it is possible to select a region where $A_{eff}$ is large. For example, when the coordinates are represented by (d/Λ, Λ), the air holes are set to d/Λ and Λ in a region surrounded by a polygon having four vertices A (0.20, 7.80),
B (0.20, 4.00),
C (0.80, 4.00), and
D (0.80, 50.0).

As described above, by setting to d/Λ and Λ where the range illustrated in FIG. 12 and the range illustrated in FIG. 14, FIG. 15 or FIG. 16 overlap each other, the second higher-order mode or more, the third higher-order mode or more, or the fourth higher-order mode or more is sufficiently cut off, and thus, it is possible to select a region where the $A_{eff}$ is large.

Figure 17:
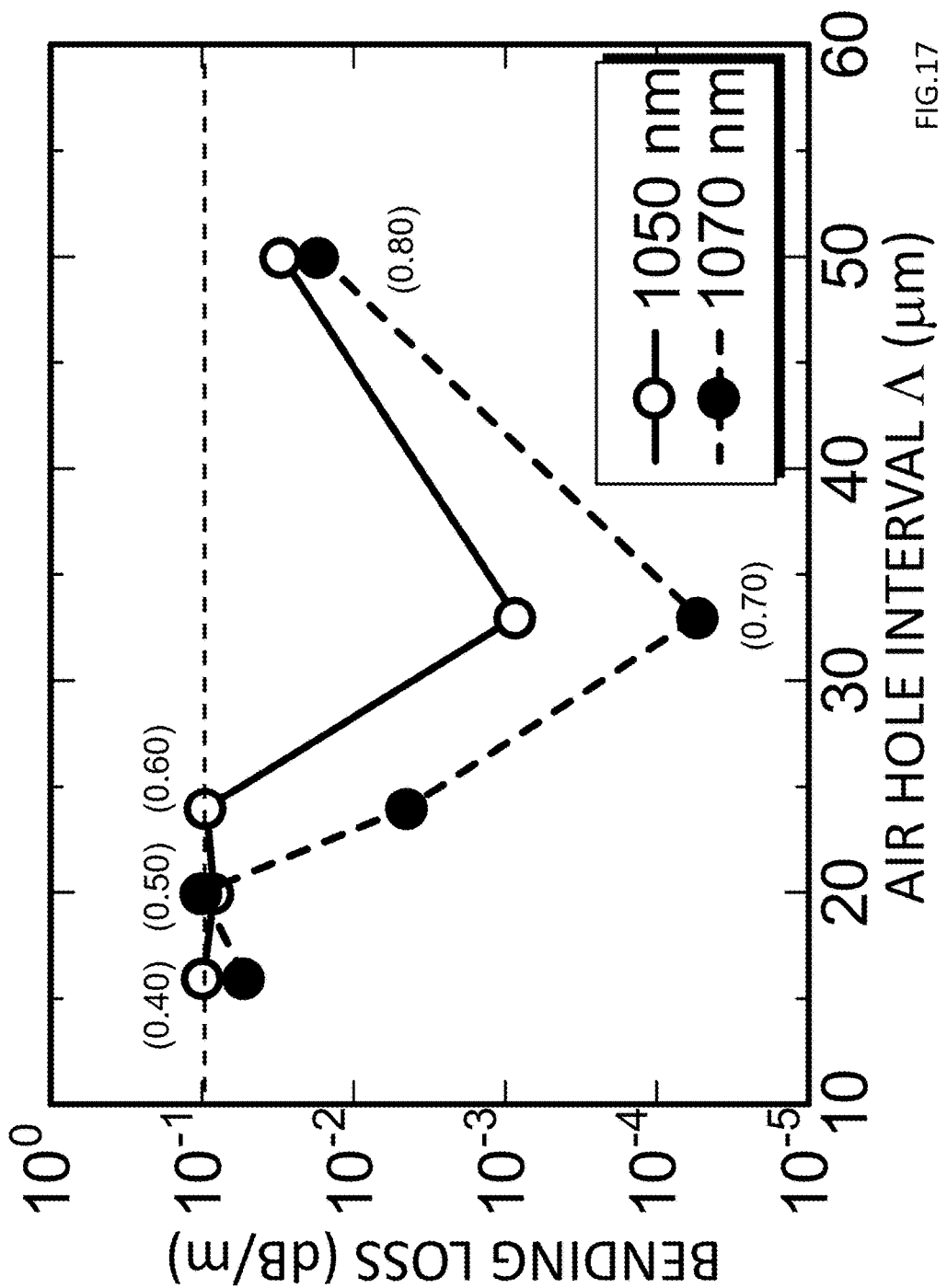
FIG. 17 is a diagram for explaining structure dependency of 1050 nm and 1070 nm of a bending loss in the fundamental mode of a PCF having a 7-cell structure.

FIG. 17 illustrates wavelength dependency of a bending loss of a PCF with a 7-cell structure. In the figure, the solid line (open circles) and the broken line (black circles) illustrate air hole interval Λ dependency of the bending loss in the fundamental mode for the wavelength 1050 nm and the wavelength 1070 nm, respectively, as, and the values in parentheses in the figure indicate values of d/Λ for each Λ. It is generally known that the PCF has characteristics in that the $A_{eff}$ has almost the same value regardless of the propagation wavelength and the bending loss increases as the wavelength becomes shorter. FIG. 17 illustrates that the structure illustrated in this design is realized in any structure where the bending loss in the fundamental mode is 0.1 dB/m or less even at a wavelength of 1050 nm and that the present design is effective at a wavelength of 1050 nm or more.

Embodiment 4

In the embodiment, another design method of designing the 2-mode fiber or the 4-mode fiber described in Embodiments 1 to 3 on the basis of specifications as an optical propagation medium such as a laser processing system will be described. The optical fiber design method according to the embodiment includes:

a specification value determining step of determining fiber loss and Raman gain coefficient of a photonic crystal fiber (PCF) to be used, a wavelength of propagating light, a beam quality M² after PCF propagation, a laser output power value, a propagation distance, and a minimum bending radius;

propagation modesmaximum number of propagation modes calculating step of calculating the number n of propagation modes that can be propagated by using Mathematical Formula 1;

an effective area calculating step of calculating an effective area $A_{eff}$ from the fiber loss and the Raman gain coefficient by using Mathematical Formula 2;

a fiber structure calculating step of calculating diameter and interval of air holes of the PCF satisfying the $A_{eff}$;

a bending loss calculating step of calculating a bending loss at the minimum bending radius in a PCF having a structure calculated in the fiber structure calculating step and calculating a bending loss at a propagation length from the propagation distance;

a checking step of checking that the bending loss at the propagation length is, for example, less than 0.1 dB and determining the structure of the PCF calculated in the fiber structure calculating step; and a mode increasing step of, in a case where the bending loss at the propagation length is, for example, 0.1 dB or more in the checking step, repeating the fiber structure calculating step, the bending loss calculating step, and the checking step by increasing the number of modes by one until the number of modes reaches number n of propagation modes.

Figure 18:
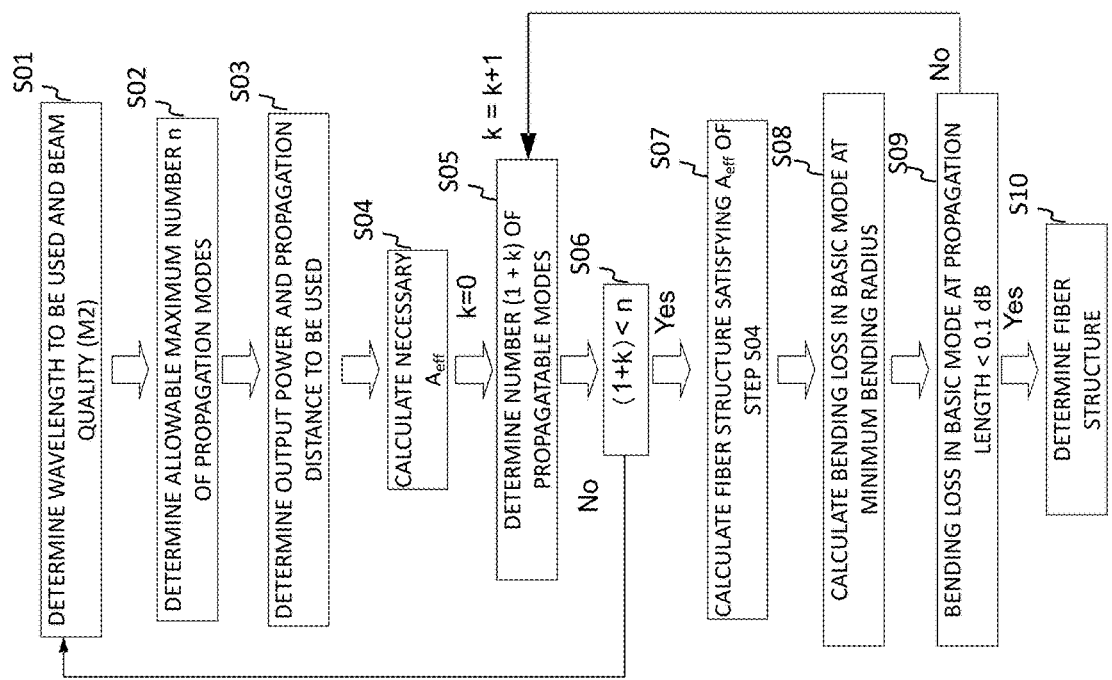
FIG. 18 is a flowchart explaining for an optical fiber design method according to the present invention.

FIG. 18 is a flowchart illustrating a procedure of the optical fiber design method according to the embodiment.

First, in step S01 (specification value determining step), the used wavelength and target beam quality ($M^2$ value) are determined. Next, in step S02 (number-of-propagation modes calculating step), the number of propagation modes that can satisfy the $M^2$ value of step S01 is calculated from Mathematical Formula (1) (Mathematical Formula (17) of Non Patent Literature 6), and the number n of propagation modes is determined.

After that, an output power and a propagation distance to be used in step S03 (specification value determining step) are determined, and in step S04 (effective area calculating step), a required effective area ($A_{eff}$) is calculated by using Mathematical Formula (2) (SRS threshold definition formula (8.1.13) disclosed in Non Patent Literature 7).

Next, in step S05, the number (1+k) of propagatable modes is determined. At this time, in order to improve the beam quality as much as possible, the design is started from the single mode of which the number (1+k) of propagation modes is 1 (k=0). Since step S06 can always be satisfied when k=0, the process proceeds to step S07 (fiber structure calculating step), and a fiber structure satisfying the $A_{eff}$ calculated in step S04 is calculated. In step S08 (bending loss calculating step), the bending loss in the fundamental mode at the minimum bending radius to be used in the fiber structure designed in step S07 is calculated, and in a case where the bending loss exceeds a specified value in step S09, the process returns to step S05, and the number of propagatable modes is incremented by 1, and the procedure up to step S09 is repeated (mode increasing step). At this time, in a case where the number (1+k) of modes exceeds the number n of propagation modes in step S06, there is no solution of the fiber structure satisfying the output power and propagation distance using the set beam quality, so that the process returns to step S01 to review the specification values such as the beam quality ($M^2$ value) and repeats the procedure from step S02 to determine the fiber structure.

[Mathematical Formula 1]

$$M^2 = Cn\sqrt{\frac{(V_{cutoff}^{(n+1),m})^2 + 2(n^2 - 1)}{3}} \qquad (1)$$

Herein, $V_{cutoff}^{(n+1),\alpha}$: Cutoff Value of V Numbers in Immediately Upper Mode $LP_{n+1,\alpha}$ Cn: Cn=1+½ cos(ξ) when $LP_{i,m}$, Cn=1 when $LP_{n,m}(n \neq 1)$ n: Allowable number of propagation modes

[Mathematical Formula 2]

$$P_{th} = \frac{16 A_{eff}}{g_R L_{eff}} \qquad (2)$$

Herein, $P_{th}$: SRS Threshold Value $L_{eff}$: Effective Interaction Length $$L_{eff} = \frac{1 - \exp(-\alpha_p L)}{\alpha_p}$$

α: Transmission Loss and $$\alpha_p = \frac{\alpha}{4.343}$$

$g_R$: Raman Gain Coefficient

Hereinafter, design examples of the PCF using the above-described design flow are described.

First, in step S01, specification values are determined. Herein, the specification values are as follows.

Fiber loss: 1 dB/km (transmission loss of fiber at the following wavelength)
Raman gain coefficient $g_R$: 8.79×10$^{-12}$ (cm/W)
Used wavelength of propagating light λ: 1070 nm
Beam quality $M^2$: 1.5 or less
Laser output power value: 100 W
Propagation distance: 300 m
Minimum bending radius: 140 m The Raman gain coefficient gR is calculated by using Mathematical Formula (4) (Mathematical Formula (36) disclosed in Non Patent Literature 8).

[Mathematical Formula 4]

$$g_R = \frac{0.94 \times 10^{-11}}{\lambda}(1 + 80\Delta) \qquad (4)$$

Herein, Δ is a relative refractive index difference between a core and a clad, and $$\Delta = \frac{n_{core}^2 - n_{clad}^2}{2n_{core}^2}.$$

According to Mathematical Formula (1) in step S02, the allowable number n of propagation modes becomes 2 (cutoff V of LP11=2.405, and cutoff V of LP 21=3.832). However, in a case where the number of propagation modes is 2, it is necessary to set the excitation ratio of the first higher-order mode to 50% or less. Subsequently, in step S04, the necessary $A_{eff}$ is calculated to be about 160 μm² from Mathematical Formula (2) (the SRS threshold used in Mathematical Formula (2) is the output power determined in step S03). Since the SRS threshold calculated from the Mathematical Formula (2) varies depending on the fiber loss and $g_R$, the necessary $A_{eff}$ also varies. Therefore, the fiber loss and $g_R$ are not limited to the contents of the present invention, and are appropriately changed according to the material or the like of the fiber to be used.

Next, the process proceeds to step S05, and first, fiber structure design is performed in a single-mode (the number of propagatable modes is 1). The structure design of PCF can be performed by structure analysis according to a finite element method disclosed in Non Patent Literature 9, an approximate analysis disclosed in Non Patent Literature 10, or the like, and in the embodiment, the structure analysis according to the finite element method is used. The analysis method is not limited to the embodiment, and any method capable of analyzing a structure of a fiber may be appropriately used.

In the embodiment, analysis is performed by using a finite element method. In the 1-cell structure PCF, if it is set that d/Λ=0.42 and Λ=12 μm, $A_{eff}$=184 μm² is obtained, and thus, the value satisfies the $A_{eff}$ value calculated in step S04. Subsequently, the process proceeds to step S08. In the above-described structure where the minimum bending radius is 140 mm, the bending loss in the fundamental mode is calculated as $1\times10^{-4}$ dB/m at R 140 mm. Since the propagation distance is 300 m, the total bending loss is 0.03 dB. In step S09, it is checked whether the bending loss value at the propagation length is 0.1 dB or less. Since the bending loss after the propagation of 300 m is 0.03 dB as described above, the requirement of step S09 is satisfied, and the fiber structure is determined by this structure (step S10).

In addition, since the confinement loss in the first higher-order mode is 6 dB/m or more, this structure operates in a single-mode and causes some axis shift, and even in a case where the first higher-order mode is excited, the first higher-order mode after the propagation of 300 m has a sufficiently small excitation ratio due to the bending loss.

In addition, in a case where k=0 (fundamental mode) and the requirement of step S09 is not satisfied, the process returns to step S05, k is increased (the number of modes is increased), and step S06 to step S09 are repeated. As the number of modes increases, the fiber structure calculated in step S07 is changed, and the bending loss in the fundamental mode is also changed. Steps S05 to S09 are repeated to find the structure with the bending loss satisfying the requirement.

The above description is an example of the structure calculated by using the design flow of FIG. 18, and the fiber parameters may be determined as appropriate by this design flow on the basis of the target beam quality, output power, and propagation distance.

Herein, as expressed in Mathematical Formula (2), the maximum output power (SRS threshold) and the Leff interaction length are inversely proportional to each other. In the optical fiber according to the present invention, since a relatively short propagation distance of 1 km or less is assumed, the Leff and the propagation distance L become equivalent values. Therefore, in this specification, output power performance is described as a product (kW·m) of an output power and a propagation distance. In addition, the propagation distance is not limited to 1 km or less, and the propagation distance can be similarly applied as long as the Leff and the L can be regarded as equivalent to each other.

Embodiments 5 to 8

Embodiments 5 to 8 will be described with reference to FIGS. 19 to 22. The figures illustrate regions where, as desired PCF parameters, d/Λ is represented by the horizontal axis and Λ is represented by the vertical axis. Herein, (a) in the condition of $M^2$≤2.0, the coordinates are set to
A1 (0.42, 16.88),
A2 (0.48, 25.31),
A3 (0.57, 40.00),
B (0.42, 10.94),
C1 (0.60, 15.63),
C2 (0.69, 31.88),
C3 (0.76, 47.81),
D (0.74, 43.12),
E (0.75, 44.38),
F (0.81, 60.63),
G (0.85, 60.63),
H (0.85, 77.50), and
I (0.90, 91.88), (b) in the condition of $M^2$≤3.3, the coordinates are set to
A1 (0.42, 16.88),
A2 (0.47, 25.31),
A3 (0.56, 40.00),
B (0.42, 10.94),
C1 (0.75, 15.00),
C2 (0.78, 35.00),
C3 (0.90, 54.38),
D1 (0.75, 20.00),
D2 (0.80, 35.93),
E (0.80, 45.63),
F (0.83, 51.56), and
I (0.90, 91.88), and (c) in the condition where the number of propagation modes is 4 or less, the coordinates are set to
A1 (0.42, 16.88),
A2 (0.48, 25.31),
A3 (0.57, 40.00),
A4 (0.75, 68.36),
B (0.42, 10.94),
C (0.75, 14.24),
D (0.75, 12.10),
E (0.79, 20.00),
F (0.85, 30.00),
F1 (0.85, 36.37),
G (0.85, 41.58),
H (0.89, 50.00),
H1 (0.89, 54.37),
I (0.89, 58.95),
J (0.90, 60.0),
J1 (0.90, 77.07), and
K (0.90, 91.88).

Embodiment 5

[1-Cell Structure, 30 kW·m Propagation]

Figure 19:
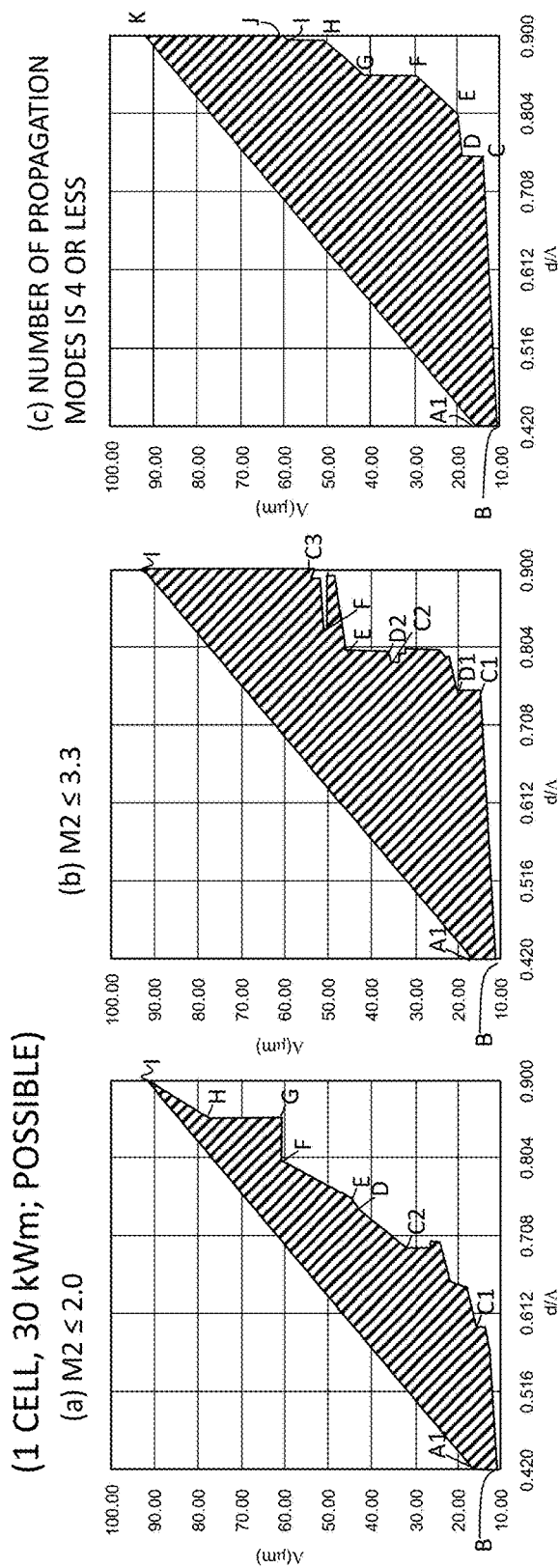
FIG. 19 is a diagram for explaining a relationship between $d/\Lambda$, $\Lambda$, and $A_{eff}$ (160 µm² or more) that satisfy (a) $M^2 \leq 2.0$, (b) $M^2 \leq 3.3$, and (c) the number of propagation modes is 4 or less when light having a wavelength of 1070 nm is propagated with a PCF having a 1-cell structure. The hatched region is a region where 100 W output power and 300 m propagation become possible.

In the embodiment, ranges of PCF parameters (Λ and d) of a 1-cell structure in FIG. 4 enabling 30 kW·m propagation will be described. FIG. 19 is a diagram for explaining a relationship between d/Λ, Λ, and $A_{eff}$ (160 μm² or more) that satisfy (a) $M^2$≤2.0, (b) $M^2$≤3.3, and (c) the number of propagation modes is 4 or less when light having a wavelength of 1070 nm is propagated. The plotted region (hatched region) has a structure capable of performing 30 kW·m propagation in a PCF having a 1-cell structure.

More specifically, (a) in a case where $M^2$≤2.0, the air holes are set to d/Λ and Λ in a region surrounded by a polygon having vertices A1, B, C1, C2, D, E, C3, F, G, H, and I. In addition, (b) in a case where $M^2$≤3.3, the air holes are set to d/Λ and Λ in a region surrounded by a polygon having vertices A1, B, C1, D1, C2, D2, E, F, C3, and I. On the other hand, (c) in a case where the number of propagation modes is 4 or less, the air holes are set to d/Λ and Λ in a region surrounded by a polygon having vertices A1, B, C, D, E, F, G, H, I, J, and K.

Embodiment 6

[1-Cell Structure, 150 kW·m Propagation]

Figure 20:
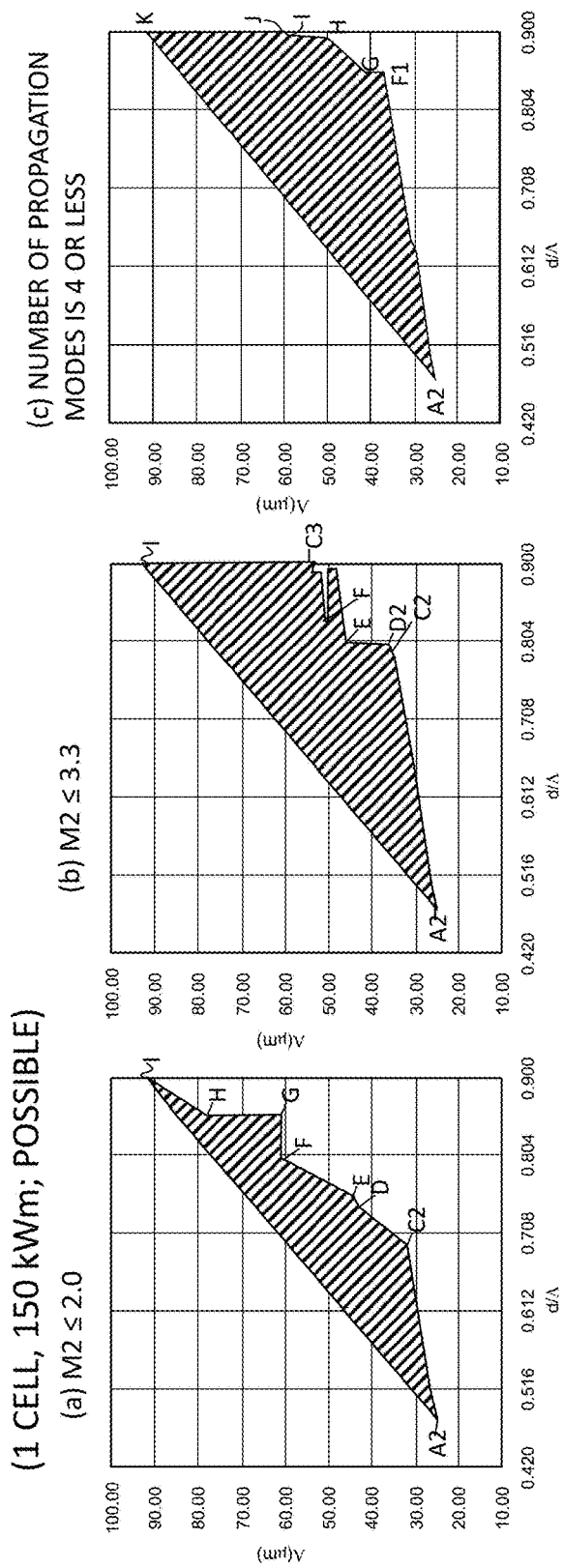
FIG. 20 is a diagram for explaining a relationship between d/Λ, Λ, and $A_{eff}$ (800 μm² or more) that satisfy (a) $M^2 \leq 2.0$, (b) $M^2 \leq 3.3$, and (c) the number of propagation modes is 4 or less when light having a wavelength of 1070 nm is propagated with a PCF having a 1-cell structure. The hatched region is a region where 500 W output power and 300 m propagation become possible.

In the embodiment, ranges of PCF parameters (Λ and d) of a 1-cell structure in FIG. 4 enabling 150 kW·m propagation will be described. FIG. 20 is a diagram for explaining a relationship between d/Λ, Λ, and $A_{eff}$ (800 μm² or more) that satisfy (a) $M^2 \leq 2.0$, (b) $M^2 \leq 3.3$, and (c) the number of propagation modes is 4 or less when light having a wavelength of 1070 nm is propagated. The plotted region (hatched region) has a structure capable of performing 150 kW·m propagation in a PCF having a 1-cell structure.

More specifically, (a) in a case where $M^2 \leq 2.0$, the air holes are set to d/Λ and Λ in a region surrounded by a polygon having vertices A2, C2, D, E, C3, F, G, H, and I. In addition, (b) in a case where $M^2 \leq 3.3$, the air holes are set to d/Λ and Λ in a region surrounded by a polygon having vertices A2, C2, D2, E, F, C3, and I. On the other hand, (c) in a case where the number of propagation modes is 4 or less, the air holes are set to d/Λ and Λ in a region surrounded by a polygon having vertices A2, F1, G, H, I, J, and K.

Embodiment 7

[1-Cell Structure, 300 kW·m Propagation]

Figure 21:
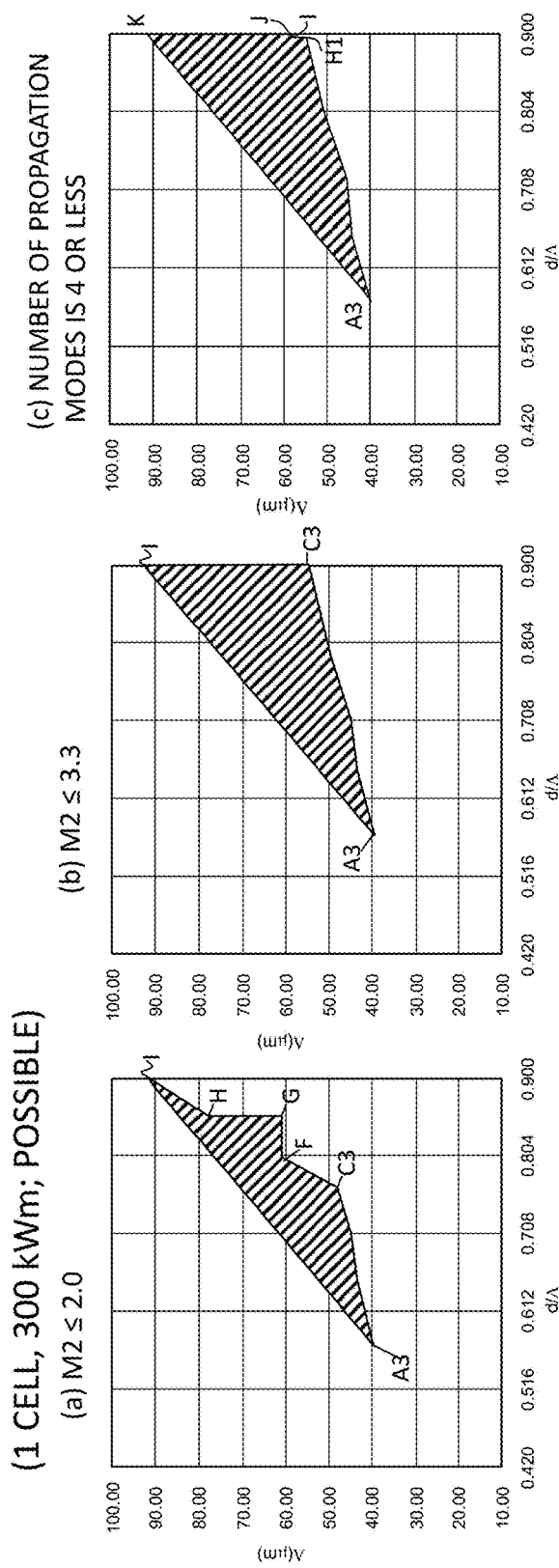
FIG. 21 is a diagram for explaining a relationship between d/Λ, Λ, and $A_{eff}$ (1600 μm² or more) that satisfy (a) $M^2 \leq 2.0$, (b) $M^2 \leq 3.3$, and (c) the number of propagation modes is 4 or less when light having a wavelength of 1070 nm is propagated with a PCF having a 1-cell structure. The hatched region is a region where 1000 W output power and 300 m propagation become possible.

In the embodiment, ranges of PCF parameters (Λ and d) of a 1-cell structure in FIG. 4 that enables 300 kW·m propagation will be described. FIG. 21 is a diagram for explaining a relationship between d/Λ, Λ, and $A_{eff}$ (1600 μm² or more) that satisfy (a) $M^2 \leq 2.0$, (b) $M^2 \leq 3.3$, and (c) the number of propagation modes is 4 or less when light having a wavelength of 1070 nm is propagated. The plotted region (hatched region) has a structure capable of performing 300 kW·m propagation in a PCF having a 1-cell structure.

More specifically, (a) in a case where $M^2 \leq 2.0$, the air holes are set to d/Λ and Λ in a region surrounded by a polygon having vertices A3, C3, F, G, H, and I. In addition, (b) in a case where $M^2 \leq 3.3$, the air holes are set to d/Λ and Λ in a region surrounded by a polygon having vertices A3, C3, and I. On the other hand, (c) in a case where the number of propagation modes is 4 or less, the air holes are set to d/Λ and Λ in a region surrounded by a polygon having vertices A3, H1, I, J, and K.

Embodiment 8

[1-Cell Structure, 600 kW·m Propagation]

Figure 22:
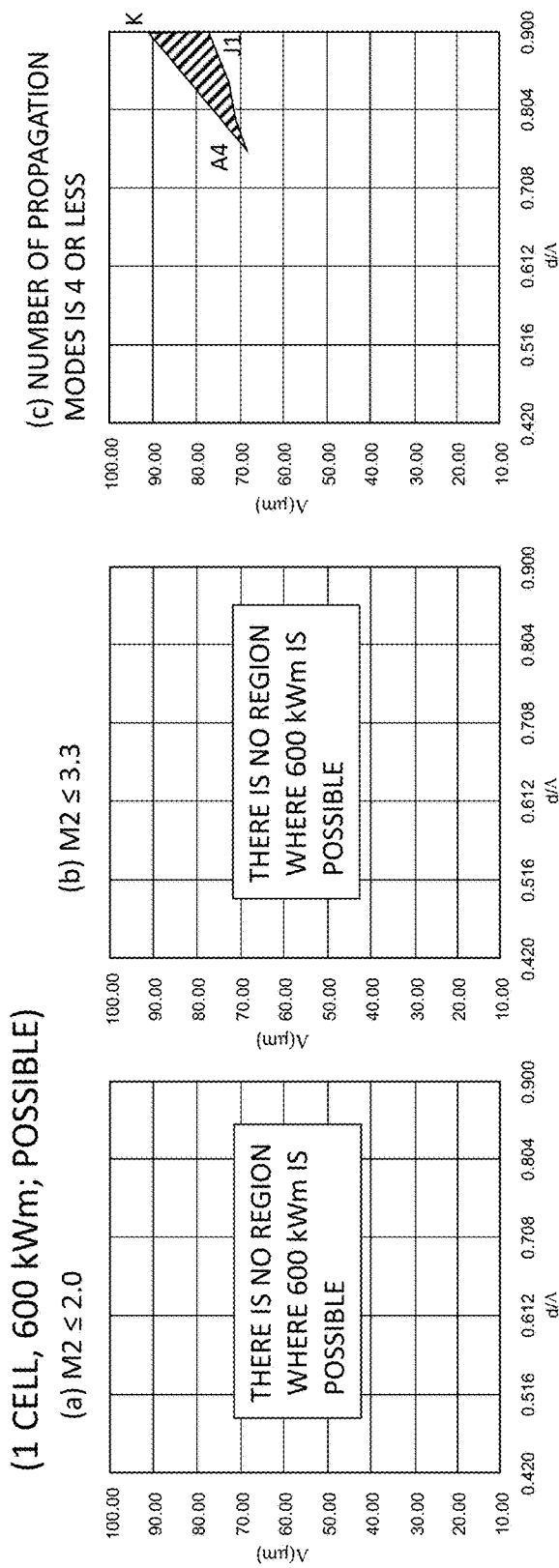
FIG. 22 is a diagram for explaining a relationship between d/Λ, Λ, and $A_{eff}$ (3200 μm² or more) that satisfy (a) $M^2 \leq 2.0$, (b) $M^2 \leq 3.3$, and (c) the number of propagation modes is 4 or less when light having a wavelength of 1070 nm is propagated with a PCF having a 1-cell structure. The hatched region is a region where 600 kWm propagation becomes possible. There is no region satisfying the conditions (a) and (b).

In the embodiment, ranges of PCF parameters (Λ and d) of a 1-cell structure in FIG. 4 that enables 600 kW·m propagation will be described. FIG. 22 is a diagram for explaining a relationship between d/Λ, Λ, and $A_{eff}$ (3200 μm² or more) that satisfy (a) $M^2 \leq 2.0$, (b) $M^2 \leq 3.3$, and (c) the number of propagation modes is 4 or less when light having a wavelength of 1070 nm is propagated. The plotted region (hatched region) has a structure capable of performing 600 kW·m propagation in a PCF having a 1-cell structure.

More specifically, in a case where (a) $M^2 \leq 2.0$ and (b) $M^2 \leq 3.3$, there is no structure capable of performing 600 kW·m propagation in the fundamental mode in the a PCF having a 1-cell structure. On the other hand, (c) in a case where the number of propagation modes is 4 or less, the air holes are set to d/Λ and Λ in a region surrounded by a polygon having vertices A4, J1, and K.

Embodiments 9 to 13

Embodiments 9 to 13 will be described with reference to FIGS. 23 to 27. The figures illustrate regions when, as desired PCF parameters, d/Λ is represented by the horizontal axis and Λ is represented by the vertical axis. Herein, (a) in $M^2 \leq 2.0$, the coordinates are set to A1 (0.20, 10.98),
A2 (0.21, 11.77),
A3 (0.27, 16.06),
A4 (0.40, 24.46),
A5 (0.53, 32.87),
B (0.20, 4.95),
C1 (0.25, 5.27),
C2 (0.40, 12.88),
C3 (0.60, 20.34),
C4 (0.68, 29.56),
C5 (0.72, 36.35),
D (0.29, 9.87),
E (0.40, 12.25),
F (0.40, 13.52),
G (0.49, 14.15),
H (0.49, 15.74),
I (0.50, 18.12),
J (0.58, 18.12),
K (0.58, 19.86),
L (0.60, 23.03),
M (0.68, 23.99),
N (0.68, 31.60),
O (0.79, 48.73), and
P (0.80, 50.00), (b) in $M^2 \leq 3.3$, the coordinates are set to A1 (0.20, 10.98),
A2 (0.21, 11.77),
A3 (0.27, 16.06),
A4 (0.40, 24.78),
A5 (0.53, 32.87),
B (0.20, 5.11),
C1 (0.40, 5.90),
C2 (0.50, 13.68),
C3 (0.60, 20.18),
C4 (0.70, 30.01),
C5 (0.73, 37.00),
D (0.40, 10.03),
E (0.50, 11.93),
F (0.50, 14.47),
C3 (0.60, 20.18),
G (0.69, 22.08),
H (0.68, 23.67),
I (0.70, 24.30),
J (0.70, 32.87), and
K (0.80, 50.00), and (c) in the condition where the number of propagation modes is 4 or less, the coordinates are set to A1 (0.20, 10.98),
A2 (0.21, 11.77),
A3 (0.27, 16.06),
A4 (0.40, 24.78),
A5 (0.53, 32.87),
B (0.20, 5.11),
C (0.50, 6.23),
D (0.50, 10.00),
E (0.60, 15.18),
F (0.60, 17.76),
G (0.65, 20.12),
H (0.70, 20.35),
I (0.79, 25.06),
J (0.79, 29.53),
K (0.78, 29.76),
K1 (0.78, 30.66),
L (0.78, 38.29),
M (0.80, 40.12), and
N (0.80, 50.00).

Embodiment 9

[7-Cell Structure, 30 kW·m Propagation]

Figure 23:
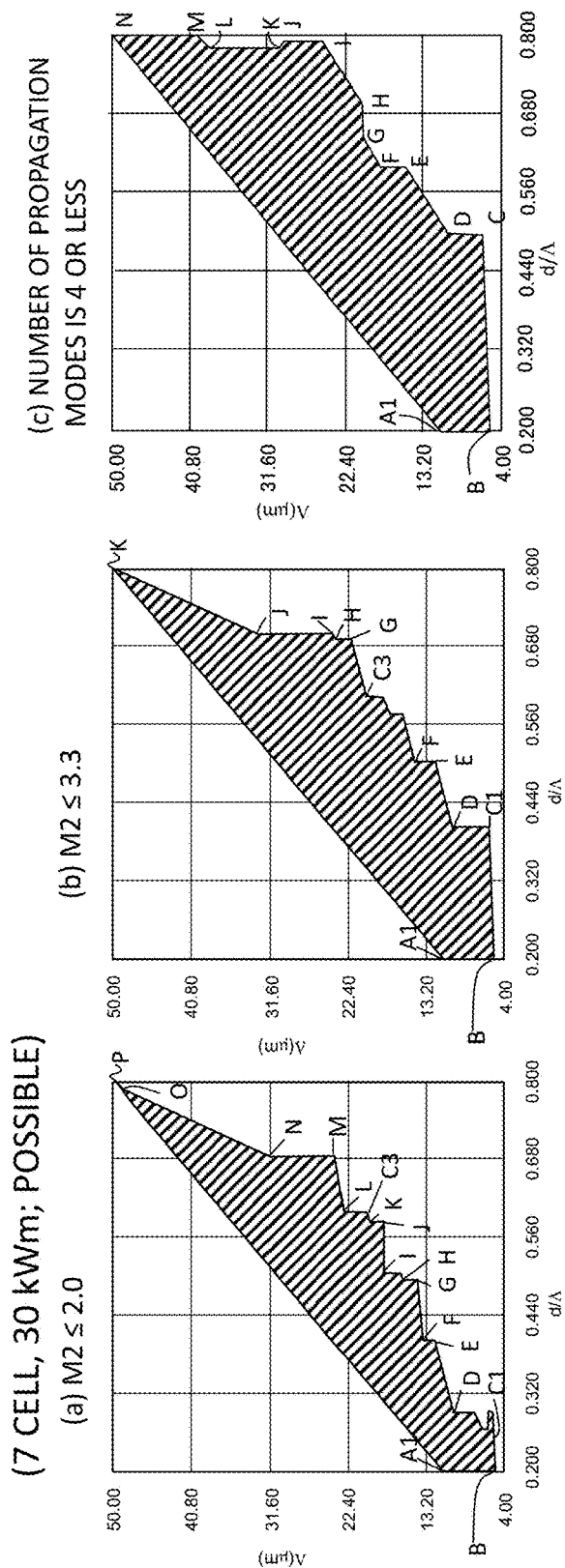
FIG. 23 is a diagram for explaining a relationship between d/Λ, Λ, and $A_{eff}$ (160 μm² or more) that satisfy (a) $M^2 \leq 2.0$, (b) $M^2 \leq 3.3$, and (c) the number of propagation modes is 4 or less when light having a wavelength of 1070 nm is propagated with a PCF having a 7-cell structure. The hatched region is a region where 100 W output power and 300 m propagation become possible.

In the embodiment, ranges of PCF parameters (A and d) of a 7-cell structure in FIG. 10 that enables 30 kW·m propagation will be described. FIG. 23 is a diagram for explaining a relationship between d/Λ, Λ, and $A_{eff}$ (160 μm$^2$ or more) that satisfy (a) $M^2 \leq 2.0$, (b) $M^2 \leq 3.3$, and (c) the number of propagation modes is 4 or less when light having a wavelength of 1070 nm is propagated. The plotted region (hatched region) has a structure capable of performing 30 kW·m propagation in a PCF having a 7-cell structure.

More specifically, (a) in a case where $M^2 \leq 2.0$, the air holes are set to d/Λ and Λ in a region surrounded by a polygon having vertices A1, B, C1, D, E, F, G, H, I, J, K, C3, L, M, N, O, and P. In addition, (b) in a case where $M^2 \leq 3.3$, the air holes are set to d/Λ and Λ in a region surrounded by a polygon having vertices A1, B, C1, D, E, F, C3, G, H, I, J, and K. On the other hand, (c) in a case where the number of propagation modes is 4 or less, the air holes are set to d/Λ and Λ in a region surrounded by a polygon having vertices A1, B, C, D, E, F, G, H, I, J, K, L, M, and N.

Embodiment 10

[7-Cell Structure, 150 kW·m Propagation]

Figure 24:
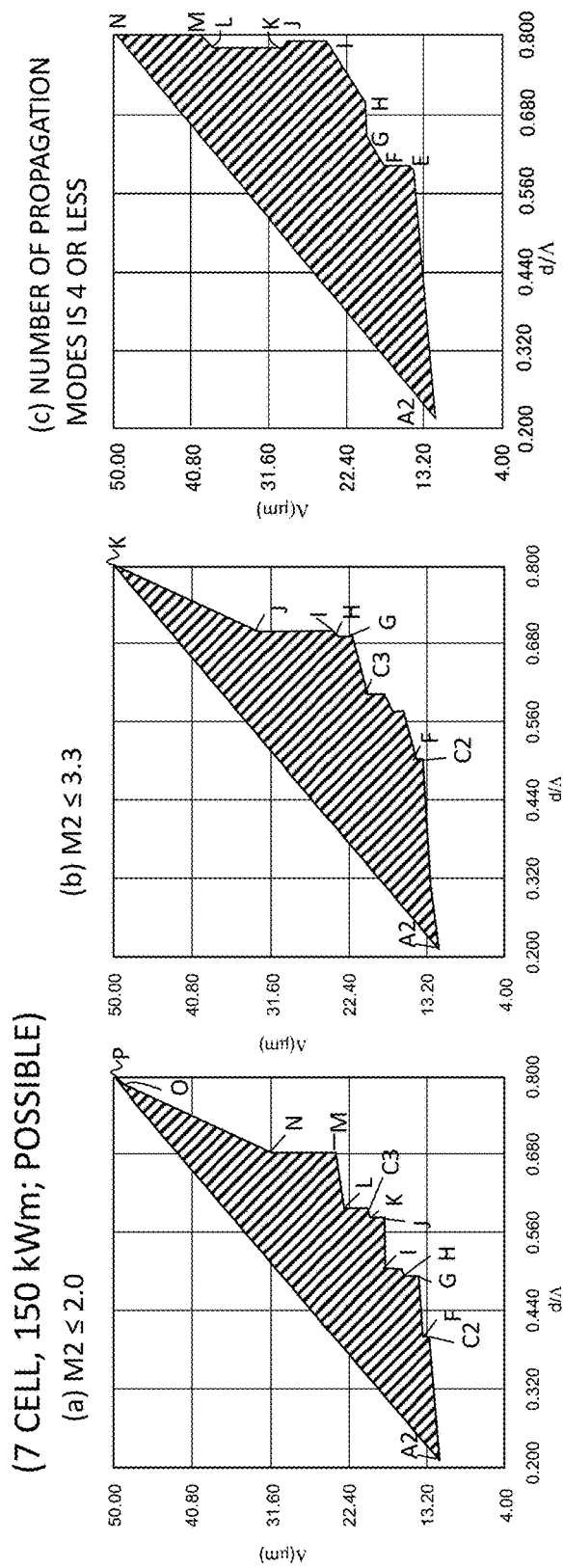
FIG. 24 is a diagram for explaining a relationship between d/Λ, Λ, and $A_{eff}$ (800 μm² or more) that satisfy (a) $M^2 \leq 2.0$, (b) $M^2 \leq 3.3$, and (c) the number of propagation modes is 4 or less when light having a wavelength of 1070 nm is propagated with a PCF having a 7-cell structure. The hatched region is a region where 500 W output power and 300 m propagation become possible.

In the embodiment, ranges of PCF parameters (A and d) of a 7-cell structure of FIG. 11 that enables 150 kW·m propagation will be described. FIG. 24 is a diagram for explaining a relationship between d/Λ, Λ, and $A_{eff}$ (800 μm$^2$ or more) that satisfy (a) $M^2 \leq 2.0$, (b) $M^2 \leq 3.3$, and (c) the number of propagation modes is 4 or less when light having a wavelength of 1070 nm is propagated. The plotted area (hatched area) has a structure capable of performing 150 kW·m propagation in a PCF having a 7-cell structure.

More specifically, (a) in a case where $M^2 \leq 2.0$, the air holes are set to d/Λ and Λ in a region surrounded by a polygon having vertices A2, C2, F, G, H, I, J, K, C3, L, M, N, O, and P. In addition, (b) in a case where $M^2 \leq 3.3$, the air holes are set to d/Λ and Λ in a region surrounded by a polygon having vertices A2, C2, F, C3, G, H, I, J, and K. On the other hand, (c) in a case where the number of propagation modes is 4 or less, the air holes are set to d/Λ and Λ in a region surrounded by a polygon having vertices A2, E, F, G, H, I, J, K, L, M, and N.

Embodiment 11

[7-Cell Structure, 300 kW·m Propagation]

Figure 25:
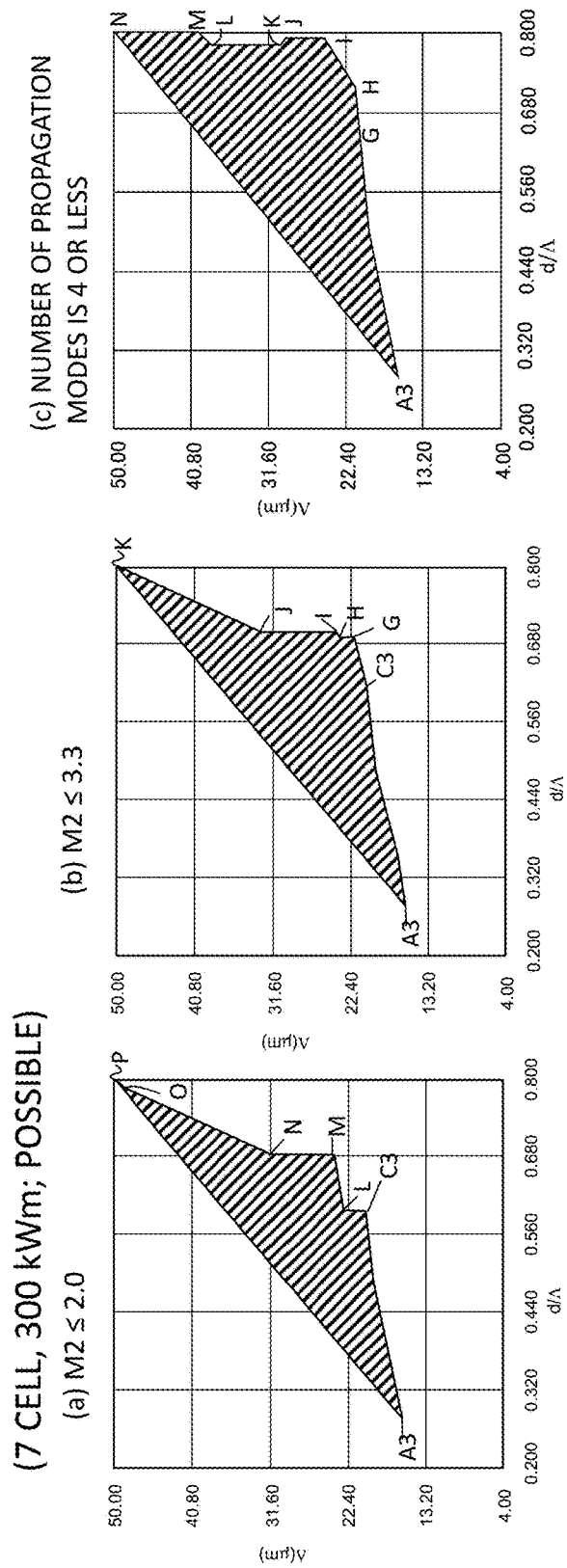
FIG. 25 is a diagram for explaining a relationship between d/Λ, Λ, and $A_{eff}$ (1600 μm² or more) that satisfy (a) $M^2 \leq 2.0$, (b) $M^2 \leq 3.3$, and (c) the number of propagation modes is 4 or less when light having a wavelength of 1070 nm is propagated with a PCF having a 7-cell structure. The hatched region is a region where 1000 W output power and 300 m propagation become possible.

In the embodiment, ranges of PCF parameters (A and d) of a 7-cell structure in FIG. 11 that enables 300 kW·m propagation will be described. FIG. 25 is a diagram for explaining a relationship between d/Λ, Λ, and $A_{eff}$ (1600 μm$^2$ or more) that satisfy (a) $M^2 \leq 2.0$, (b) $M^2 \leq 3.3$, and (c) the number of propagation modes is 4 or less when light having a wavelength of 1070 nm is propagated. The plotted region (hatched region) has a structure capable of performing 300 kW·m propagation in a PCF having a 7-cell structure.

More specifically, (a) in a case where $M^2 \leq 2.0$, the air holes are set to d/Λ and Λ in a region surrounded by a polygon having vertices A3, C3, L, M, N, O, and P. In addition, (b) in a case where $M^2 \leq 3.3$, the air holes are set to d/Λ and Λ in a region surrounded by a polygon having vertices A3, C3, G, H, I, J, and K. On the other hand, (c) in a case where the number of propagation modes is 4 or less, the air holes are set to d/Λ and Λ in a region surrounded by a polygon having vertices A3, G, H, I, J, K, L, M, and N.

Embodiment 12

[7-Cell Structure, 600 kW·m Propagation]

Figure 26:
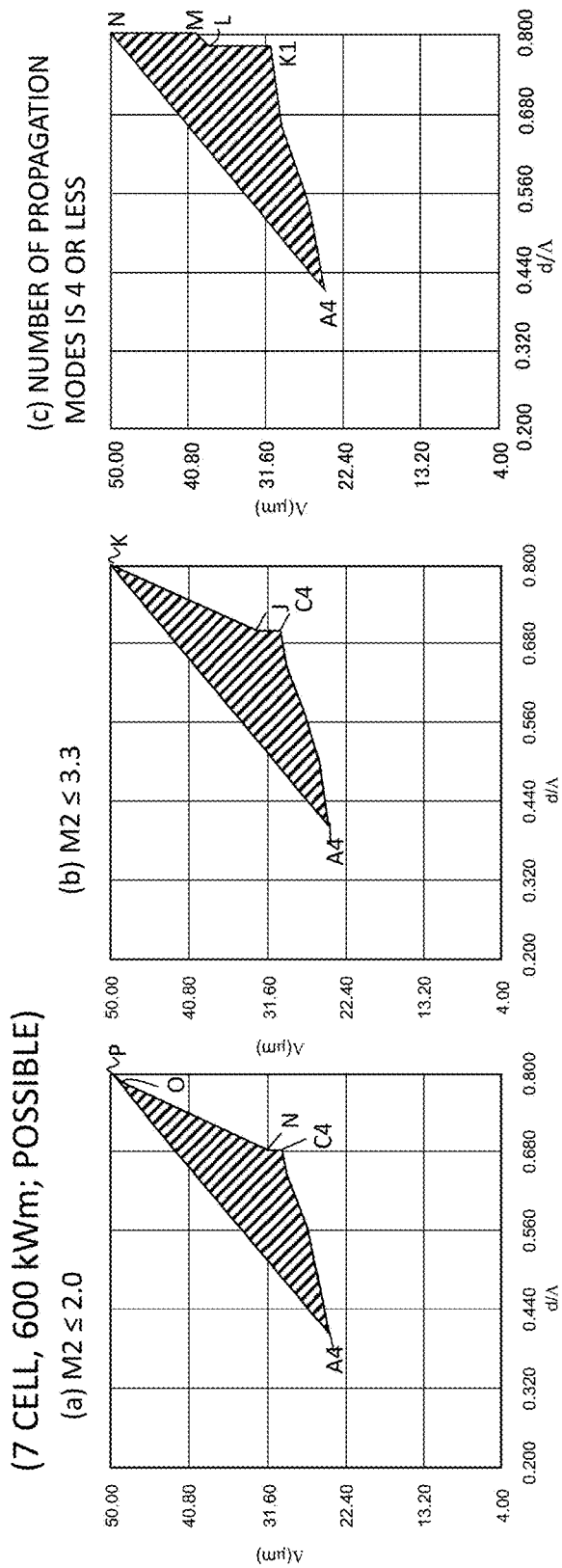
FIG. 26 is a diagram for explaining a relationship between d/Λ, Λ, and $A_{eff}$ (3200 μm² or more) that satisfy (a) $M^2 \leq 2.0$, (b) $M^2 \leq 3.3$, and (c) the number of propagation modes is 4 or less when light having a wavelength of 1070 nm is propagated with a PCF having a 7-cell structure. The hatched region is a region where 2000 W output power and 300 m propagation become possible.

In the embodiment, ranges of PCF parameters (A and d) of a 7-cell structure of FIG. 11 that enables 600 kW·m propagation will be described. FIG. 26 is a diagram for explaining a relationship between d/Λ, Λ, and $A_{eff}$ (3200 μm$^2$ or more) that satisfy (a) $M^2 \leq 2.0$, (b) $M^2 \leq 3.3$, and (c) the number of propagation modes is 4 or less when light having a wavelength of 1070 nm is propagated. The plotted region (hatched region) has a structure capable of performing 600 kW·m propagation in a PCF having a 7-cell structure.

More specifically, (a) in a case where $M^2 \leq 2.0$, the air holes are set to d/Λ and Λ in a region surrounded by a polygon having vertices A4, C4, N, O, and P. In addition, (b) in a case where $M^2 \leq 3.3$, the air holes are set to d/Λ and Λ in a region surrounded by a polygon having vertices A4, C4, J, and K. On the other hand, (c) in a case where the number of propagation modes is 4 or less, the air holes are set to d/Λ and Λ in a region surrounded by a polygon having vertices A4, K1, L, M, and N.

Embodiment 13

[7-Cell Structure, 900 kW·m Propagation]

Figure 27:
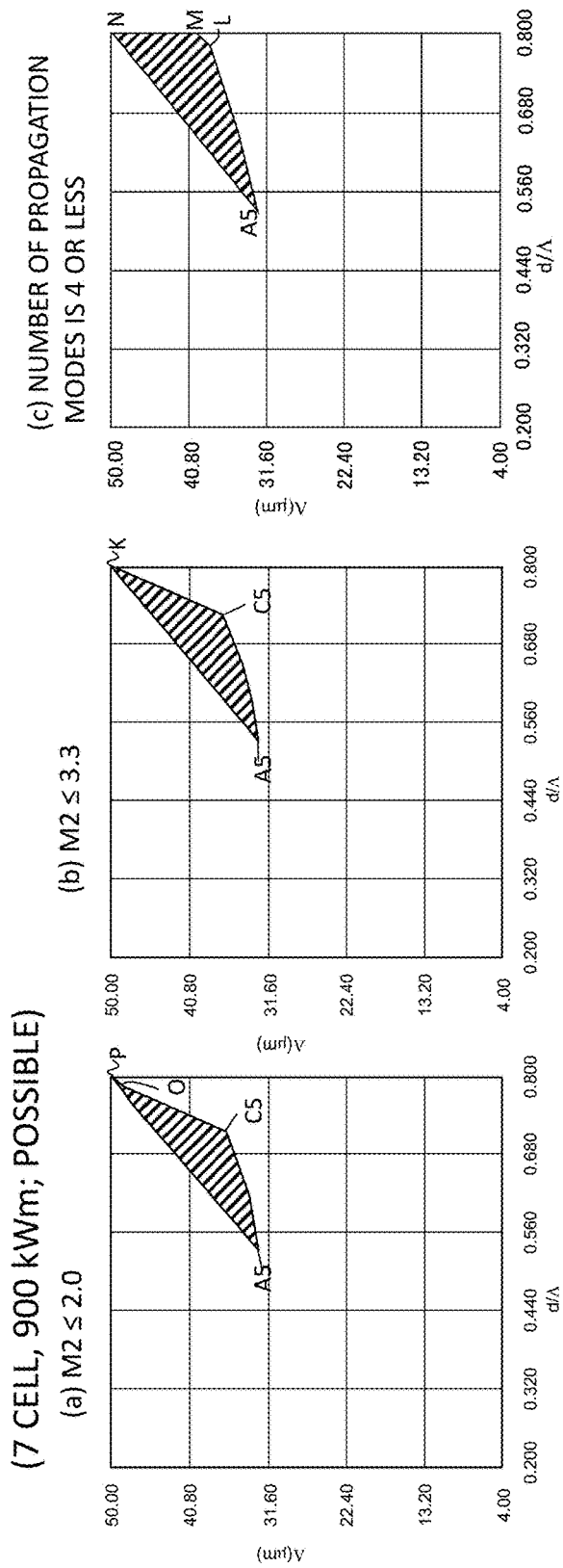
FIG. 27 is a diagram for explaining a relationship between d/Λ, Λ, and $A_{eff}$ (4800 μm² or more) that satisfy (a) $M^2 \leq 2.0$, (b) $M^2 \leq 3.3$, and (c) the number of propagation modes is 4 or less when light having a wavelength of 1070 nm is propagated with a PCF having a 7-cell structure. The hatched region is a region where 3000 W output power and 300 m propagation become possible.

In the embodiment, ranges of PCF parameters (A and d) of a 7-cell structure of FIG. 11 that enables 900 kW·m propagation will be described. FIG. 27 is a diagram for explaining a relationship between d/Λ, Λ, and $A_{eff}$ (4800 μm$^2$ or more) that satisfy (a) $M^2 \leq 2.0$, (b) $M^2 \leq 3.3$, and (c) the number of propagation modes is 4 or less when light having a wavelength of 1070 nm is propagated. The plotted area (hatched area) has a structure capable of performing 900 kW·m propagation in a PCF having a 7-cell structure.

More specifically, if (a) $M^2 \leq 2.0$, the air holes are set to d/Λ and Λ in a region surrounded by a polygon having vertices A5, C5, 0, and P. In addition, (b) in a case where $M^2 \leq 3.3$, the air holes are set to d/Λ and Λ in a region surrounded by a polygon having vertices A5, C5, and K. On the other hand, (c) in a case where the number of propagation modes is 4 or less, the air holes are set to d/Λ and Λ in a region surrounded by a polygon having vertices A5, K, M, and N.

Effect of the Invention

In the present invention, with respect to required output power and propagation distance, a definition formula of an SRS threshold is used, and with respect to the required beam quality, an $M^2$ value in a case where a propagation mode is uniformly excited from a bending loss and the number of propagatable modes is used as a threshold, so that it is possible to design a fiber structure satisfying the above conditions. Furthermore, it is possible to clarify a specific structure of high-quality high-power propagation optical fiber by using the design flow. As a specific design example, a structural example of a PCF is illustrated.

As described above, according to an optical fiber and an optical fiber design method according to the present invention, it is possible to provide an optical fiber capable of ensuring an output power with respect to a propagation length at a desired beam quality which cannot be realized in the design of the related art.

(Function)

The fiber structure designed by using the design flow used in the present invention can satisfy required output power, propagation distance and beam quality. Even in a region of an output power of a fiber laser which has been realized only with a multi-mode with an $M^2$ value of 8 or more, it is possible to realize use of light having high quality beam quality for a desired propagation distance by using an optical fiber with an $M^2$ value of less than 8 for a fiber laser.

INDUSTRIAL APPLICABILITY

The present invention is applicable to the field of laser processing using a fiber laser.

REFERENCE SIGNS LIST

1: PCF
2: air hole

The invention claimed is:

1. A photonic crystal fiber (PCF),
wherein the PCF is for laser processing,
wherein the PCF has a 1-cell structure in which an effective area Aeff is 800 μm$^2$ or more, a bending loss in a fundamental mode with a bending radius of 140 mm is 1.0 dB/m or less in light having a wavelength of 1070 nm, and air holes having diameters d are arranged at intervals Λ, wherein the air holes extend in a propagation direction of light,
wherein a number of propagation modes is set to 2 or more and 4 or less to raise an index of beam quality M2 of output light up to 3.3, by including the air holes having diameters d and intervals Λ in a design region surrounded by a polygon having vertices
A2 (0.47, 25.31),
C2 (0.78, 35.00),
C3 (0.90, 54.38),
D2 (0.80, 35.93),
E (0.80, 45.63),
F (0.83, 51.56), and
I (0.90, 91.88), and
wherein coordinates are represented by (d/Λ, Λ), and a propagation of 30 kW·m or more and 150 kW·m or less is enabled for light having a wavelength of 1050 nm or more.

2. The PCF according to claim 1,
wherein the air holes are surrounded by a polygon having vertices
A2 (0.48, 25.31),
C2 (0.69, 31.88),
D (0.74, 43.12),
E (0.75, 44.38),
F (0.81, 60.63),
G (0.85, 60.63),
H (0.85, 77.50), and
I (0.90, 91.88),
in the design region, and
the index of beam quality M2 of the output light is set up to 2.

3. A photonic crystal fiber (PCF),
wherein the PCF is for laser processing,
wherein the PCF has a 1-cell structure in which an effective area Aeff is 1600 μm$^2$ or more, a bending loss in a fundamental mode with a bending radius of 140 mm is 1.0 dB/m or less in light having a wavelength of 1070 nm, and air holes having diameters d are arranged at intervals Λ, wherein the air holes extend in a propagation direction of light,
wherein a number of propagation modes is set to 2 or more and 4 or less to raise an index of beam quality M2 of output light up to 3.3, by including the air holes having diameters d and intervals Λ in a design region surrounded by a polygon having vertices
A3 (0.56, 40.00),
C3 (0.90, 54.38), and
I (0.90, 91.88), and
wherein coordinates are represented by (d/Λ, Λ), and a propagation of 30 kW·m or more and 300 kW·m or less is enabled for light having a wavelength of 1050 nm or more.

4. The PCF according to claim 3,
wherein the air holes are surrounded by a polygon having vertices
A3 (0.57, 40.00),
C3 (0.76, 47.81),
F (0.81, 60.63),
G (0.85, 60.63),
H (0.85, 77.50), and
I (0.90, 91.88),
in the design region, and
the index of beam quality M2 of the output light is set up to 2.

5. A photonic crystal fiber (PCF),
wherein the PCF is for laser processing,
wherein the PCF has a 7-cell structure in which an effective area Aeff is 800 μm$^2$ or more, a bending loss in a fundamental mode with a bending radius of 140 mm is 1.0 dB/m or less in light having a wavelength of 1070 nm, and air holes having diameters d are arranged at intervals Λ, wherein the air holes extend in a propagation direction of light,
wherein a number of propagation modes is set to 2 or more and 4 or less to raise an index of beam quality M2 of output light up to 3.3, by including the air holes having diameters d and intervals Λ in a design region surrounded by a polygon having vertices
A2 (0.21, 11.77),
C2 (0.50, 13.68),
C3 (0.60, 20.18),
F (0.50, 14.47),
G (0.69, 22.08),
H (0.68, 23.67),
I (0.70, 24.30),
J (0.70, 32.87), and
K (0.80, 50.00), and
wherein coordinates are represented by (d/Λ, Λ), and a propagation of 30 kW·m or more and 150 kW·m or less is enabled for light having a wavelength of 1050 nm or more.

6. The PCF according to claim 5,
wherein the air holes are surrounded by a polygon having vertices
A2 (0.21, 11.77),
C2 (0.40, 12.88),
C3 (0.60, 20.34),
F (0.40, 13.52),
G (0.49, 14.15),
H (0.49, 15.74),
I (0.50, 18.12),
J (0.58, 18.12),
K (0.58, 19.86),
L (0.60, 23.03), M (0.68, 23.99),
N (0.68, 31.60),
O (0.79, 48.73), and
P (0.80, 50.00),
in the design region, and
the index of beam quality M2 of the output light is set up to 2.

7. A photonic crystal fiber (PCF),
wherein the PCF is for laser processing,
wherein the PCF has a 7-cell structure in which an effective area Aeff is 1600 μm$^2$ or more, a bending loss in a fundamental mode with a bending radius of 140 mm is 1.0 dB/m or less in light having a wavelength of 1070 nm, and air holes having diameters d are arranged at intervals Λ, wherein the air holes extend in a propagation direction of light,
wherein a number of propagation modes is set to 2 or more and 4 or less to raise an index of beam quality M2 of output light up to 3.3, by including the air holes having diameters d and intervals Λ in a design region surrounded by a polygon having vertices
A3 (0.27, 16.06),
C3 (0.60, 20.18),
G (0.69, 22.08),
H (0.68, 23.67),
I (0.70, 24.30),
J (0.70, 32.87), and
K (0.80, 50.00), and
wherein coordinates are represented by (d/Λ, Λ), and a propagation of 30 kW·m or more and 300 kW·m or less is enabled for light having a wavelength of 1050 nm or more.

8. The PCF according to claim 7,
wherein the air holes are surrounded by a polygon having vertices
A3 (0.27, 16.06),
C3 (0.60, 20.34),
L (0.60, 23.03),
M (0.68, 23.99),
N (0.68, 31.60),
O (0.79, 48.73), and
P (0.80, 50.00),
in the design region, and
the index of beam quality M2 of the output light is set up to 2.

9. A photonic crystal fiber (PCF),
wherein the PCF is for laser processing,
wherein the PCF has a 7-cell structure in which an effective area Aeff is 3200 μm$^2$ or more, a bending loss in a fundamental mode with a bending radius of 140 mm is 1.0 dB/m or less in light having a wavelength of 1070 nm, and air holes having diameters d are arranged at intervals Λ, wherein the air holes extend in a propagation direction of light,
wherein a number of propagation modes is set to 2 or more and 4 or less to raise an index of beam quality M2 of output light up to 3.3, by including the air holes having diameters d and intervals Λ in a design region surrounded by a polygon having vertices
A4 (0.40, 24.78),
C4 (0.70, 30.01),
J (0.70, 32.87), and
K (0.80, 50.00), and
wherein coordinates are represented by (d/Λ, Λ), and a propagation of 30 kW·m or more and 600 kW·m or less is enabled for light having a wavelength of 1050 nm or more.

10. The PCF according to claim 9,
wherein the air holes are surrounded by a polygon having vertices
A4 (0.40, 24.46),
C4 (0.68, 29.56),
N (0.68, 31.60),
O (0.79, 48.73), and
P (0.80, 50.00),
in the design region, and
the index of beam quality M2 of the output light is set up to 2.

11. A photonic crystal fiber (PCF),
wherein the PCF is for laser processing,
wherein the PCF has a 7-cell structure in which an effective area Aeff is 4800 μm$^2$ or more, a bending loss in a fundamental mode with a bending radius of 140 mm is 1.0 dB/m or less in light having a wavelength of 1070 nm, and air holes having diameters d are arranged at intervals Λ, wherein the air holes extend in a propagation direction of light,
wherein a number of propagation modes is set to 2 or more and 4 or less to raise an index of beam quality M2 of output light up to 3.3, by including the air holes having diameters d and intervals Λ in a design region surrounded by a polygon having vertices
A5 (0.53, 32.87),
C5 (0.73, 37.00), and
K (0.80, 50.00), and
wherein coordinates are represented by (d/Λ, Λ), and a propagation of 30 kW·m or more and 900 kW·m or less is enabled for light having a wavelength of 1050 nm or more.

12. The PCF according to claim 11,
wherein the air holes are surrounded by a polygon having vertices
A5 (0.53, 32.87),
C5 (0.72, 36.35),
O (0.79, 48.73), and
P (0.80, 50.00),
in the design region, and
the index of beam quality M2 of the output light is set up to 2.

* * * * *